US011360641B2

(12) United States Patent
Ford et al.

(10) Patent No.: US 11,360,641 B2
(45) Date of Patent: Jun. 14, 2022

(54) INCREASING THE RELEVANCE OF NEW AVAILABLE INFORMATION

(71) Applicant: Apple Inc., Cupertino, CA (US)

(72) Inventors: Joshua Rominski Ford, Santa Clara, CA (US); Reza Azimi, San Francisco, CA (US); Lucas Olen Winstrom, Palo Alto, CA (US); Zachary James Waterson, San Francisco, CA (US); Terrence J. Talbot, Campbell, CA (US); James D. Dusseau, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 16/548,651

(22) Filed: Aug. 22, 2019

(65) Prior Publication Data
US 2020/0379610 A1 Dec. 3, 2020

Related U.S. Application Data

(60) Provisional application No. 62/856,008, filed on Jun. 1, 2019.

(51) Int. Cl.
*G06F 3/0482* (2013.01)
*G06F 16/248* (2019.01)
(Continued)

(52) U.S. Cl.
CPC .......... *G06F 3/0482* (2013.01); *G06F 3/0485* (2013.01); *G06F 16/248* (2019.01); *G06F 16/24578* (2019.01)

(58) Field of Classification Search
CPC .... G06F 3/0482; G06F 3/0485; G06F 16/248; G06F 16/2457–24578; G06F 16/3326;
(Continued)

(56) References Cited

U.S. PATENT DOCUMENTS

| 7,231,652 B2 * | 6/2007 | Gutta ..................... G06N 20/00 725/46 |
| 7,475,010 B2 | 1/2009 | Chao |

(Continued)

FOREIGN PATENT DOCUMENTS

| AU | 2014100581 B4 | 9/2014 |
| AU | 2015203483 A1 | 7/2015 |

(Continued)

OTHER PUBLICATIONS

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

(Continued)

*Primary Examiner* — David S Posigian
(74) *Attorney, Agent, or Firm* — Dentons US LLP

(57) ABSTRACT

An example method includes, at an electronic device with one or more processors and memory: detecting a new type of available information, the new type of available information being associated with a card for display in a content feed; in accordance with detecting the new type of available information, increasing a relevance score of the card above a display threshold; in accordance with increasing the relevance score above the display threshold: causing the card to be displayed in the content feed; and obtaining data representing user interaction with the displayed card; adjusting, based on the data representing user interaction with the displayed card, the relevance score; and modifying a display of the card in the content feed based on the adjusted relevance score.

51 Claims, 14 Drawing Sheets

(51) Int. Cl.
*G06F 16/2457* (2019.01)
*G06F 3/0485* (2022.01)

(58) Field of Classification Search
CPC ...... G06F 16/335; G06F 16/337; G06F 16/34;
G06F 16/345; G06F 16/3346; G06F
16/338; G06F 16/838; G06F 16/9038;
G06F 16/9538; G06F 11/3438; G01C
22/006; A61B 5/00–7495; A63B 24/0062;
A63B 2230/00–755; H04L 67/22
See application file for complete search history.

(56) References Cited

U.S. PATENT DOCUMENTS

| | | | |
|---|---|---|---|
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,251 B2 | 2/2009 | Gao et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,519,398 B2 | 4/2009 | Hirose |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,529,677 B1 | 5/2009 | Wittenber |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,542,971 B2 | 6/2009 | Thione et al. |
| 7,543,232 B2 | 6/2009 | Easton, Jr. et al. |
| 7,546,382 B2 | 6/2009 | Healey et al. |
| 7,546,529 B2 | 6/2009 | Reynar et al. |
| 7,548,895 B2 | 6/2009 | Pulsipher |
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,567,861 B2 | 7/2009 | Inagaki |
| 7,568,151 B2 | 7/2009 | Bargeron et al. |
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,092 B2 | 9/2009 | Brockett |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,603,684 B1 | 10/2009 | Ellis |
| 7,606,444 B1 | 10/2009 | Erol et al. |
| 7,606,712 B1 | 10/2009 | Smith et al. |
| 7,607,083 B2 | 10/2009 | Gong et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,900 B1 | 12/2009 | Strom |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,430 B2 | 2/2010 | Ogawa |
| 7,657,828 B2 | 2/2010 | Lucas et al. |
| 7,657,844 B2 | 2/2010 | Gibson et al. |
| 7,657,849 B2 | 2/2010 | Chaudhri et al. |
| 7,660,715 B1 | 2/2010 | Thambiratnam |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,668,710 B2 | 2/2010 | Doyle |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,251 B1 | 3/2010 | Wibisono |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |

(56) References Cited

U.S. PATENT DOCUMENTS

| | | |
|---|---|---|
| 7,689,408 B2 | 3/2010 | Chen et al. |
| 7,689,409 B2 | 3/2010 | Heinecke |
| 7,689,412 B2 | 3/2010 | Wu et al. |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,707 B2 | 7/2010 | Garner et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,176 B2 | 7/2010 | Vakil et al. |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,202 B2 | 8/2010 | Spengler et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,069 B2 | 8/2010 | Frid-nielsen et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carigren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,246 B1 | 11/2010 | Smith et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,998 B1 | 1/2011 | Di Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |

(56) References Cited

U.S. PATENT DOCUMENTS

| | | |
|---|---|---|
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,936,861 B2 | 5/2011 | Martin et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | Lange et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,176 B2 | 7/2011 | Latzina et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,010,614 B1 | 8/2011 | Musat et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,019,604 B2 | 9/2011 | Ma |
| 8,020,104 B2 | 9/2011 | Robarts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,231 B2 | 10/2011 | Hirota et al. |
| 8,046,363 B2 | 10/2011 | Cha et al. |
| 8,046,374 B1 | 10/2011 | Bromwich et al. |
| 8,050,500 B1 | 11/2011 | Batty et al. |
| 8,054,180 B1 | 11/2011 | Scofield et al. |
| 8,055,296 B1 | 11/2011 | Persson et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Eishishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,368 B2 | 3/2012 | Eggenberger et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,170,966 B1 | 5/2012 | Musat et al. |
| 8,175,872 B2 | 5/2012 | Kristjansson |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,194,827 B2 | 6/2012 | Jaiswal et al. |
| 8,195,467 B2 | 6/2012 | Mozer et al. |
| 8,195,468 B2 | 6/2012 | Kennewick et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,712 B2 | 8/2012 | Serlet et al. |
| 8,250,071 B1 | 8/2012 | Killalea et al. |
| 8,254,829 B1 | 8/2012 | Kindred |
| 8,255,216 B2 | 8/2012 | White |

(56) References Cited

U.S. PATENT DOCUMENTS

| | | |
|---|---|---|
| 8,255,217 B2 | 8/2012 | Stent et al. |
| 8,260,247 B2 | 9/2012 | Lazaridis et al. |
| 8,260,617 B2 | 9/2012 | Dhanakshirur et al. |
| 8,260,619 B1 | 9/2012 | Bansal et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,285,737 B1 | 10/2012 | Lynn et al. |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B2 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,346,757 B2 | 1/2013 | Lamping |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,457,959 B2 | 6/2013 | Kaiser |
| 8,458,115 B2 | 6/2013 | Cai et al. |
| 8,458,278 B2 | 6/2013 | Christie et al. |
| 8,464,150 B2 | 6/2013 | Davidson et al. |
| 8,473,289 B2 | 6/2013 | Jitkoff et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,531 B1 | 8/2013 | Kim |
| 8,527,276 B1 | 9/2013 | Senior et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,571,851 B1 | 10/2013 | Tickner et al. |
| 8,577,683 B2 | 11/2013 | DeWitt |
| 8,583,416 B2 | 11/2013 | Huang et al. |
| 8,583,511 B2 | 11/2013 | Hendrickson |
| 8,589,156 B2 | 11/2013 | Burke et al. |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,638,363 B2 | 1/2014 | King et al. |
| 8,639,516 B2 | 1/2014 | Lindahl et al. |
| 8,645,137 B2 | 2/2014 | Bellegarda et al. |
| 8,645,138 B1 | 2/2014 | Weinstein et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,687,777 B1 | 4/2014 | Lavian et al. |
| 8,688,446 B2 | 4/2014 | Yanagihara et al. |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,751,971 B2 | 6/2014 | Fleizach |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |

(56) References Cited

U.S. PATENT DOCUMENTS

| | | |
|---|---|---|
| 8,768,693 B2 | 7/2014 | Lempel et al. |
| 8,768,702 B2 | 7/2014 | Boettcher et al. |
| 8,775,154 B2 | 7/2014 | Clinchant et al. |
| 8,775,177 B1 | 7/2014 | Heigold et al. |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,812,302 B2 | 8/2014 | Xiao et al. |
| 8,823,507 B1 | 9/2014 | Touloumtzis |
| 8,831,947 B2 | 9/2014 | Wasserblat et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,409 B1 | 10/2014 | Mengibar et al. |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,983,383 B1 | 3/2015 | Haskin |
| 8,984,098 B1* | 3/2015 | Tomkins ............. G06F 16/9535 709/219 |
| 8,989,713 B2 | 3/2015 | Doulton |
| 8,990,235 B2 | 3/2015 | King et al. |
| 8,994,660 B2 | 3/2015 | Neels et al. |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,009,046 B1 | 4/2015 | Stewart |
| 9,020,804 B2 | 4/2015 | Barbaiani et al. |
| 9,026,425 B2 | 5/2015 | Nikoulina et al. |
| 9,031,834 B2 | 5/2015 | Coorman et al. |
| 9,031,970 B1 | 5/2015 | Das et al. |
| 9,037,967 B1 | 5/2015 | Al-Jefri et al. |
| 9,043,208 B2 | 5/2015 | Koch et al. |
| 9,043,211 B2 | 5/2015 | Haiut et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,183,845 B1 | 11/2015 | Gopalakrishnan et al. |
| 9,190,062 B2 | 11/2015 | Haughay |
| 9,208,153 B1 | 12/2015 | Zaveri et al. |
| 9,213,754 B1 | 12/2015 | Zhang et al. |
| 9,218,809 B2 | 12/2015 | Bellegarda |
| 9,218,819 B1 | 12/2015 | Stekkelpak et al. |
| 9,223,537 B2 | 12/2015 | Brown et al. |
| 9,241,073 B1 | 1/2016 | Van Rensburg et al. |
| 9,255,812 B2 | 2/2016 | Maeoka et al. |
| 9,258,604 B1 | 2/2016 | Bilobrov et al. |
| 9,262,612 B2 | 2/2016 | Cheyer |
| 9,280,535 B2 | 3/2016 | Varma et al. |
| 9,286,910 B1 | 3/2016 | Li et al. |
| 9,292,487 B1 | 3/2016 | Weber |
| 9,292,489 B1 | 3/2016 | Sak et al. |
| 9,299,344 B2 | 3/2016 | Braho et al. |
| 9,300,718 B2 | 3/2016 | Khanna |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,330,659 B2 | 5/2016 | Ju et al. |
| 9,330,668 B2 | 5/2016 | Nanavati et al. |
| 9,330,720 B2 | 5/2016 | Lee |
| 9,338,493 B2 | 5/2016 | Van Os et al. |
| 9,349,368 B1 | 5/2016 | LeBeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,377,871 B2 | 6/2016 | Waddell et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,406,299 B2 | 8/2016 | Gollan et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,840 B1 | 8/2016 | Hart et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,833 B2 | 10/2016 | Aravamudan et al. |
| 9,465,864 B2 | 10/2016 | Hu et al. |
| 9,471,566 B1 | 10/2016 | Zhang et al. |
| 9,483,461 B2 | 11/2016 | Fleizach et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,519,453 B2 | 12/2016 | Perkuhn et al. |
| 9,524,355 B2 | 12/2016 | Forbes et al. |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,569,549 B1 | 2/2017 | Jenkins et al. |
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,620,113 B2 | 4/2017 | Kennewick et al. |

(56) References Cited

U.S. PATENT DOCUMENTS

| | | | |
|---|---|---|---|
| 9,620,126 B2 | 4/2017 | Chiba |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,659,298 B2 | 5/2017 | Lynch et al. |
| 9,665,567 B2 | 5/2017 | Liu et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,827 B1 | 7/2017 | Lilly et al. |
| 9,698,999 B2 | 7/2017 | Mutagi |
| 9,720,907 B2 | 8/2017 | Bangalore et al. |
| 9,721,566 B2 | 8/2017 | Newendorp et al. |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,755,605 B1 | 9/2017 | Li et al. |
| 9,813,882 B1 | 11/2017 | Masterman |
| 9,818,400 B2 | 11/2017 | Paulik et al. |
| 9,823,828 B2 | 11/2017 | Zambetti et al. |
| 9,842,584 B1 | 12/2017 | Hart et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,934,785 B1 | 4/2018 | Hulaud |
| 9,948,728 B2 | 4/2018 | Linn et al. |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,176 B1 | 6/2018 | Gray |
| 10,001,817 B2 | 6/2018 | Zambetti et al. |
| 10,032,455 B2 | 7/2018 | Newman et al. |
| 10,037,758 B2 | 7/2018 | Jing et al. |
| 10,049,663 B2 | 8/2018 | Orr et al. |
| 10,049,668 B2 | 8/2018 | Huang et al. |
| 10,055,681 B2 | 8/2018 | Brown et al. |
| 10,074,360 B2 | 9/2018 | Kim |
| 10,074,371 B1 | 9/2018 | Wang et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,127,901 B2 | 11/2018 | Zhao et al. |
| 10,127,908 B1 | 11/2018 | Deller et al. |
| 10,169,329 B2 | 1/2019 | Futrell et al. |
| 10,170,123 B2 | 1/2019 | Orr et al. |
| 10,175,879 B2 | 1/2019 | Missig et al. |
| 10,186,254 B2 | 1/2019 | Williams et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,557 B2 | 1/2019 | Lee et al. |
| 10,200,824 B2 | 2/2019 | Gross et al. |
| 10,216,351 B2 | 2/2019 | Yang |
| 10,248,308 B2 | 4/2019 | Karunamuni et al. |
| 10,296,160 B2 | 5/2019 | Shah et al. |
| 10,297,253 B2 | 5/2019 | Walker et al. |
| 10,325,598 B2 | 6/2019 | Basye et al. |
| 10,403,283 B1 | 9/2019 | Schramm et al. |
| 10,783,151 B1* | 9/2020 | Bushkin ............... H04L 67/26 |
| 2004/0128359 A1* | 7/2004 | Horvitz ............... H04L 67/26 |
| | | 709/207 |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006096 A1 | 1/2009 | Li et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0007188 A1 | 1/2009 | Omernick |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0024595 A1 | 1/2009 | Chen |
| 2009/0027334 A1 | 1/2009 | Foulk et al. |
| 2009/0028435 A1 | 1/2009 | Wu et al. |
| 2009/0030685 A1 | 1/2009 | Cerra et al. |
| 2009/0030800 A1 | 1/2009 | Grois |
| 2009/0030978 A1 | 1/2009 | Johnson et al. |
| 2009/0031236 A1 | 1/2009 | Robertson et al. |
| 2009/0043502 A1 | 2/2009 | Shaffer et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048841 A1 | 2/2009 | Pollet et al. |
| 2009/0048845 A1 | 2/2009 | Burckart et al. |
| 2009/0049067 A1 | 2/2009 | Murray |
| 2009/0051649 A1 | 2/2009 | Rondel et al. |
| 2009/0054046 A1 | 2/2009 | Whittington et al. |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055187 A1 | 2/2009 | Leventhal et al. |
| 2009/0055380 A1 | 2/2009 | Peng et al. |
| 2009/0055381 A1 | 2/2009 | Wu et al. |
| 2009/0055648 A1 | 2/2009 | Kim et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076798 A1 | 3/2009 | Oh et al. |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077047 A1 | 3/2009 | Cooper et al. |
| 2009/0077165 A1 | 3/2009 | Rhodes et al. |
| 2009/0077464 A1 | 3/2009 | Goldsmith et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0083249 A1 | 3/2009 | Basson et al. |
| 2009/0089058 A1 | 4/2009 | Bellegarda |
| 2009/0091537 A1 | 4/2009 | Huang et al. |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |

(56) References Cited

U.S. PATENT DOCUMENTS

| | | |
|---|---|---|
| 2009/0097637 A1 | 4/2009 | Boscher et al. |
| 2009/0098903 A1 | 4/2009 | Donaldson et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0109019 A1 | 4/2009 | Peterson et al. |
| 2009/0112572 A1 | 4/2009 | Thorn |
| 2009/0112576 A1 | 4/2009 | Jackson et al. |
| 2009/0112592 A1 | 4/2009 | Candelor et al. |
| 2009/0112596 A1 | 4/2009 | Syrdal et al. |
| 2009/0112600 A1 | 4/2009 | Gilbert et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125299 A1 | 5/2009 | Wang |
| 2009/0125477 A1 | 5/2009 | Lu et al. |
| 2009/0125602 A1 | 5/2009 | Bhatia et al. |
| 2009/0125813 A1 | 5/2009 | Shen et al. |
| 2009/0125947 A1 | 5/2009 | Ibaraki |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138263 A1 | 5/2009 | Shozakai et al. |
| 2009/0138430 A1 | 5/2009 | Nambiar et al. |
| 2009/0138736 A1 | 5/2009 | Chin |
| 2009/0138828 A1 | 5/2009 | Schultz et al. |
| 2009/0144036 A1 | 6/2009 | Jorgensen et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0150553 A1 | 6/2009 | Collart et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0157513 A1 | 6/2009 | Bonev et al. |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160761 A1 | 6/2009 | Moosavi et al. |
| 2009/0160803 A1 | 6/2009 | Hashimoto |
| 2009/0163243 A1 | 6/2009 | Barbera |
| 2009/0164301 A1 | 6/2009 | O'Sullivan et al. |
| 2009/0164441 A1 | 6/2009 | Cheyer |
| 2009/0164450 A1 | 6/2009 | Martinez et al. |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0190774 A1 | 7/2009 | Wang et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0192798 A1 | 7/2009 | Basson et al. |
| 2009/0198497 A1 | 8/2009 | Kwon |
| 2009/0204402 A1 | 8/2009 | Marhawa et al. |
| 2009/0204409 A1 | 8/2009 | Mozer et al. |
| 2009/0204478 A1 | 8/2009 | Kalb et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0224867 A1 | 9/2009 | O'Shaughnessy et al. |
| 2009/0225041 A1 | 9/2009 | Kida et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0228897 A1 | 9/2009 | Murray et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259472 A1 | 10/2009 | Schroeter |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265175 A1 | 10/2009 | Fang |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0274376 A1 | 11/2009 | Selvaraj et al. |
| 2009/0276215 A1 | 11/2009 | Hager |

(56) References Cited

U.S. PATENT DOCUMENTS

| | | |
|---|---|---|
| 2009/0278804 A1 | 11/2009 | Rubanovich et al. |
| 2009/0281789 A1 | 11/2009 | Waibel et al. |
| 2009/0284471 A1 | 11/2009 | Longe et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292674 A1 | 11/2009 | Dasdan et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299730 A1 | 12/2009 | Joh et al. |
| 2009/0299745 A1 | 12/2009 | Kennewick |
| 2009/0299751 A1 | 12/2009 | Jung |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0020035 A1 | 1/2010 | Ryu et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |
| 2010/0030562 A1 | 2/2010 | Yoshizawa et al. |
| 2010/0030928 A1 | 2/2010 | Conroy et al. |
| 2010/0031143 A1 | 2/2010 | Rao et al. |
| 2010/0031150 A1 | 2/2010 | Andrew |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036829 A1 | 2/2010 | Leyba |
| 2010/0036928 A1 | 2/2010 | Granito et al. |
| 2010/0037183 A1 | 2/2010 | Miyashita et al. |
| 2010/0037187 A1 | 2/2010 | Kondziela |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0054601 A1 | 3/2010 | Anbalagan et al. |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076968 A1 | 3/2010 | Boyns et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0079508 A1 | 4/2010 | Hodge et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082343 A1 | 4/2010 | Levit et al. |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082376 A1 | 4/2010 | Levitt |
| 2010/0082567 A1 | 4/2010 | Rosenblatt et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0094632 A1 | 4/2010 | Davis et al. |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100385 A1 | 4/2010 | Davis et al. |
| 2010/0100515 A1 | 4/2010 | Bangalore et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0114887 A1 | 5/2010 | Conway et al. |
| 2010/0121637 A1 | 5/2010 | Roy et al. |
| 2010/0125456 A1 | 5/2010 | Weng et al. |

(56) References Cited

U.S. PATENT DOCUMENTS

| | | |
|---|---|---|
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0127854 A1 | 5/2010 | Helvick et al. |
| 2010/0128701 A1 | 5/2010 | Nagaraja |
| 2010/0131265 A1 | 5/2010 | Boda et al. |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153114 A1 | 6/2010 | Shih et al. |
| 2010/0153115 A1 | 6/2010 | Klee et al. |
| 2010/0153448 A1 | 6/2010 | Harpur et al. |
| 2010/0153576 A1 | 6/2010 | Wohlert et al. |
| 2010/0161311 A1 | 6/2010 | Massuh |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185434 A1 | 7/2010 | Burvall et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0198821 A1 | 8/2010 | Loritz et al. |
| 2010/0199180 A1 | 8/2010 | Brichter et al. |
| 2010/0199215 A1 | 8/2010 | Seymour et al. |
| 2010/0199340 A1 | 8/2010 | Jonas et al. |
| 2010/0204986 A1 | 8/2010 | Kennewick et al. |
| 2010/0211199 A1 | 8/2010 | Naik et al. |
| 2010/0211379 A1 | 8/2010 | Gorman et al. |
| 2010/0211644 A1 | 8/2010 | Lavoie et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0235780 A1 | 9/2010 | Westerman et al. |
| 2010/0235793 A1 | 9/2010 | Ording et al. |
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0257490 A1 | 10/2010 | Lyon et al. |
| 2010/0262599 A1 | 10/2010 | Nitz |
| 2010/0263015 A1 | 10/2010 | Pandey et al. |
| 2010/0268537 A1 | 10/2010 | Al-Telmissani |
| 2010/0268539 A1 | 10/2010 | Xu et al. |
| 2010/0269040 A1 | 10/2010 | Lee |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278391 A1 | 11/2010 | Hsu et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286984 A1 | 11/2010 | Wandinger et al. |
| 2010/0286985 A1 | 11/2010 | Kennewick et al. |
| 2010/0287514 A1 | 11/2010 | Cragun et al. |
| 2010/0290632 A1 | 11/2010 | Lin |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0303254 A1 | 12/2010 | Yoshizawa et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318366 A1 | 12/2010 | Sullivan et al. |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332003 A1 | 12/2010 | Yaguez |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |

(56) References Cited

U.S. PATENT DOCUMENTS

| | | |
|---|---|---|
| 2011/0029616 A1 | 2/2011 | Wang et al. |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0039584 A1 | 2/2011 | Merrett |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0060812 A1 | 3/2011 | Middleton |
| 2011/0064378 A1 | 3/2011 | Gharaat et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066436 A1 | 3/2011 | Bezar |
| 2011/0066468 A1 | 3/2011 | Huang et al. |
| 2011/0066634 A1 | 3/2011 | Phillips et al. |
| 2011/0072033 A1 | 3/2011 | White et al. |
| 2011/0072492 A1 | 3/2011 | Mohler et al. |
| 2011/0075818 A1 | 3/2011 | Vance et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0093272 A1 | 4/2011 | Isobe et al. |
| 2011/0099000 A1 | 4/2011 | Rai et al. |
| 2011/0099157 A1 | 4/2011 | Lebeau et al. |
| 2011/0103682 A1 | 5/2011 | Chidlovskii et al. |
| 2011/0105097 A1 | 5/2011 | Tadayon et al. |
| 2011/0106736 A1 | 5/2011 | Aharonson et al. |
| 2011/0106878 A1 | 5/2011 | Cho et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0137664 A1 | 6/2011 | Kho et al. |
| 2011/0141141 A1 | 6/2011 | Kankainen |
| 2011/0143718 A1 | 6/2011 | Engelbart, Sr. |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0166855 A1 | 7/2011 | Vermeulen et al. |
| 2011/0167350 A1 | 7/2011 | Hoellwarth |
| 2011/0175810 A1 | 7/2011 | Markovic et al. |
| 2011/0178804 A1 | 7/2011 | Inoue et al. |
| 2011/0179002 A1 | 7/2011 | Dumitru et al. |
| 2011/0179372 A1 | 7/2011 | Moore et al. |
| 2011/0183627 A1 | 7/2011 | Ueda et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi et al. |
| 2011/0199312 A1 | 8/2011 | Okuta |
| 2011/0201385 A1 | 8/2011 | Higginbotham et al. |
| 2011/0201387 A1 | 8/2011 | Paek et al. |
| 2011/0202526 A1 | 8/2011 | Lee et al. |
| 2011/0202874 A1 | 8/2011 | Ramer et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231218 A1 | 9/2011 | Tovar |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib et al. |

(56) References Cited

U.S. PATENT DOCUMENTS

| | | |
|---|---|---|
| 2011/0249144 A1 | 10/2011 | Chang |
| 2011/0250570 A1 | 10/2011 | Mack et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264643 A1 | 10/2011 | Cao |
| 2011/0264999 A1 | 10/2011 | Bells et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0280143 A1 | 11/2011 | Li |
| 2011/0282663 A1 | 11/2011 | Talwar et al. |
| 2011/0282888 A1 | 11/2011 | Koperski et al. |
| 2011/0282906 A1 | 11/2011 | Wong |
| 2011/0283189 A1 | 11/2011 | McCarty |
| 2011/0283190 A1 | 11/2011 | Poltorak |
| 2011/0288852 A1 | 11/2011 | Dymetman et al. |
| 2011/0288855 A1 | 11/2011 | Roy |
| 2011/0288861 A1 | 11/2011 | Kurzweil et al. |
| 2011/0288863 A1 | 11/2011 | Rasmussen |
| 2011/0288866 A1 | 11/2011 | Rasmussen |
| 2011/0298585 A1 | 12/2011 | Barry |
| 2011/0301943 A1 | 12/2011 | Patch |
| 2011/0302162 A1 | 12/2011 | Xiao et al. |
| 2011/0302645 A1 | 12/2011 | Headley |
| 2011/0306426 A1 | 12/2011 | Novak et al. |
| 2011/0307241 A1 | 12/2011 | Waibel et al. |
| 2011/0307254 A1 | 12/2011 | Hunt et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0313803 A1 | 12/2011 | Friend et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0314539 A1 | 12/2011 | Horton |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084089 A1 | 4/2012 | Lloyd et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130995 A1 | 5/2012 | Risvik et al. |
| 2012/0136572 A1 | 5/2012 | Norton |
| 2012/0136649 A1 | 5/2012 | Freising et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0166429 A1 | 6/2012 | Moore et al. |
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0179467 A1 | 7/2012 | Williams |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |

(56) References Cited

U.S. PATENT DOCUMENTS

| | | |
|---|---|---|
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0262296 A1 | 10/2012 | Bezar |
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Perez et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0018659 A1 | 1/2013 | Chi |
| 2013/0018863 A1 | 1/2013 | Regan et al. |
| 2013/0024576 A1 | 1/2013 | Dishneau et al. |
| 2013/0027875 A1 | 1/2013 | Zhu et al. |
| 2013/0030787 A1 | 1/2013 | Cancedda et al. |
| 2013/0030789 A1 | 1/2013 | Dalce |
| 2013/0030804 A1 | 1/2013 | Zavaliagko et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0315038 A1 | 1/2013 | Ferren et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0069769 A1 | 3/2013 | Pennington et al. |
| 2013/0073286 A1 | 3/2013 | Bastea-Forte et al. |
| 2013/0073346 A1 | 3/2013 | Chun et al. |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096917 A1 | 4/2013 | Edgar et al. |

(56) References Cited

U.S. PATENT DOCUMENTS

| | | |
|---|---|---|
| 2013/0097566 A1 | 4/2013 | Berglund |
| 2013/0097682 A1 | 4/2013 | Zeljkovic et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen |
| 2013/0124189 A1 | 5/2013 | Baldwin et al. |
| 2013/0125168 A1 | 5/2013 | Agnihotri et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0157629 A1 | 6/2013 | Lee et al. |
| 2013/0158977 A1 | 6/2013 | Senior |
| 2013/0159347 A1 | 6/2013 | Banke et al. |
| 2013/0165232 A1 | 6/2013 | Nelson et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0174034 A1 | 7/2013 | Brown et al. |
| 2013/0176244 A1 | 7/2013 | Yamamoto et al. |
| 2013/0176592 A1 | 7/2013 | Sasaki |
| 2013/0179172 A1 | 7/2013 | Nakamura et al. |
| 2013/0179440 A1 | 7/2013 | Gordon |
| 2013/0179806 A1* | 7/2013 | Bastide ............... G06F 16/313 715/760 |
| 2013/0183944 A1 | 7/2013 | Mozer et al. |
| 2013/0185059 A1 | 7/2013 | Riccardi et al. |
| 2013/0185074 A1 | 7/2013 | Gruber |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0191117 A1 | 7/2013 | Atti et al. |
| 2013/0197911 A1 | 8/2013 | Wei et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0218553 A1 | 8/2013 | Fujii et al. |
| 2013/0218560 A1 | 8/2013 | Hsiao et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238326 A1 | 9/2013 | Kim et al. |
| 2013/0238647 A1 | 9/2013 | Thompson |
| 2013/0244615 A1 | 9/2013 | Miller et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0268263 A1 | 10/2013 | Park et al. |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0282709 A1 | 10/2013 | Zhu et al. |
| 2013/0283168 A1 | 10/2013 | Brown et al. |
| 2013/0285913 A1 | 10/2013 | Griffin et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0290905 A1* | 10/2013 | LuVogt ................ G06N 3/006 715/835 |
| 2013/0291015 A1 | 10/2013 | Pan |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0316746 A1 | 11/2013 | Miller et al. |
| 2013/0322634 A1 | 12/2013 | Bennett et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0339256 A1 | 12/2013 | Shroff |
| 2013/0343721 A1 | 12/2013 | Abecassis |
| 2013/0346068 A1 | 12/2013 | Solem et al. |
| 2013/0346347 A1 | 12/2013 | Patterson et al. |
| 2013/0347117 A1 | 12/2013 | Parks et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0012574 A1 | 1/2014 | Pasupalak et al. |
| 2014/0012580 A1 | 1/2014 | Ganong et al. |
| 2014/0012586 A1 | 1/2014 | Rubin et al. |

(56) References Cited

U.S. PATENT DOCUMENTS

| | | |
|---|---|---|
| 2014/0012587 A1 | 1/2014 | Park |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0039888 A1 | 2/2014 | Taubman et al. |
| 2014/0039893 A1 | 2/2014 | Weiner |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040801 A1 | 2/2014 | Patel et al. |
| 2014/0040918 A1 | 2/2014 | Li et al. |
| 2014/0040961 A1 | 2/2014 | Green, Sr. et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0068751 A1 | 3/2014 | Last et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074815 A1 | 3/2014 | Plimton |
| 2014/0078065 A1 | 3/2014 | Akkok et al. |
| 2014/0079195 A1 | 3/2014 | Srivastava et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0088961 A1 | 3/2014 | Woodward et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095601 A1 | 4/2014 | Abuelsaad et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0108017 A1 | 4/2014 | Mason et al. |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0132935 A1 | 5/2014 | Kim et al. |
| 2014/0134983 A1 | 5/2014 | Jung et al. |
| 2014/0135036 A1 | 5/2014 | Bonanni |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0169795 A1 | 6/2014 | Clough |
| 2014/0172878 A1 | 6/2014 | Clark et al. |
| 2014/0173460 A1 | 6/2014 | Kim |
| 2014/0180499 A1 | 6/2014 | Cooper et al. |
| 2014/0180689 A1 | 6/2014 | Kim et al. |
| 2014/0180697 A1 | 6/2014 | Torok et al. |
| 2014/0181865 A1 | 6/2014 | Koganei |
| 2014/0188477 A1 | 7/2014 | Zhang |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207466 A1 | 7/2014 | Smadi et al. |
| 2014/0207468 A1 | 7/2014 | Bartnik |
| 2014/0207582 A1 | 7/2014 | Flinn et al. |
| 2014/0214429 A1 | 7/2014 | Pantel |
| 2014/0214537 A1 | 7/2014 | Yoo et al. |
| 2014/0215513 A1 | 7/2014 | Ramer et al. |
| 2014/0218372 A1 | 8/2014 | Missig et al. |
| 2014/0222436 A1 | 8/2014 | Binder et al. |
| 2014/0222678 A1 | 8/2014 | Sheets et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229184 A1 | 8/2014 | Shires |
| 2014/0230055 A1 | 8/2014 | Boehl |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-ghazale et al. |
| 2014/0249817 A1 | 9/2014 | Hart et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |

(56) References Cited

U.S. PATENT DOCUMENTS

| | | |
|---|---|---|
| 2014/0257815 A1 | 9/2014 | Zhao et al. |
| 2014/0257902 A1 | 9/2014 | Moore et al. |
| 2014/0258857 A1 | 9/2014 | Dykstra-Erickson et al. |
| 2014/0267022 A1 | 9/2014 | Kim |
| 2014/0267599 A1 | 9/2014 | Drouin et al. |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong et al. |
| 2014/0274211 A1 | 9/2014 | Sejnoha et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278429 A1 | 9/2014 | Ganong, III |
| 2014/0278435 A1 | 9/2014 | Ganong et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282201 A1 | 9/2014 | Pasquero et al. |
| 2014/0282203 A1 | 9/2014 | Pasquero et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kains et al. |
| 2014/0310002 A1 | 10/2014 | Nitz et al. |
| 2014/0310348 A1 | 10/2014 | Keskitaio et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324884 A1 | 10/2014 | Lindahl et al. |
| 2014/0330569 A1 | 11/2014 | Kolavennu et al. |
| 2014/0330951 A1 | 11/2014 | Sukoff et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337371 A1 | 11/2014 | Li |
| 2014/0337438 A1 | 11/2014 | Govande et al. |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0343943 A1 | 11/2014 | Al-telmissani |
| 2014/0344627 A1 | 11/2014 | Schaub et al. |
| 2014/0344687 A1 | 11/2014 | Durham et al. |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2014/0365922 A1 | 12/2014 | Yang |
| 2014/0365945 A1 | 12/2014 | Karunamuni et al. |
| 2014/0370341 A1 | 12/2014 | Roberts et al. |
| 2014/0370817 A1 | 12/2014 | Luna |
| 2014/0372112 A1 | 12/2014 | Xue et al. |
| 2014/0372356 A1 | 12/2014 | Bilal et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0380285 A1 | 12/2014 | Gabel et al. |
| 2015/0003797 A1 | 1/2015 | Schmidt |
| 2015/0006148 A1 | 1/2015 | Goldszmit et al. |
| 2015/0006157 A1 | 1/2015 | Andrade Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-hancock et al. |
| 2015/0019221 A1 | 1/2015 | Lee et al. |
| 2015/0019974 A1 | 1/2015 | Doi et al. |
| 2015/0031416 A1 | 1/2015 | Wells et al. |
| 2015/0032443 A1 | 1/2015 | Karov |
| 2015/0033219 A1 | 1/2015 | Breiner et al. |
| 2015/0033275 A1 | 1/2015 | Natani et al. |
| 2015/0340040 A1 | 1/2015 | Mun et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0051754 A1 | 2/2015 | Kwon et al. |
| 2015/0053779 A1 | 2/2015 | Adamek et al. |
| 2015/0053781 A1 | 2/2015 | Nelson et al. |
| 2015/0058013 A1 | 2/2015 | Pakhomov et al. |
| 2015/0058018 A1 | 2/2015 | Georges et al. |
| 2015/0058785 A1 | 2/2015 | Ookawara |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0067822 A1 | 3/2015 | Randall |
| 2015/0071121 A1 | 3/2015 | Patil et al. |
| 2015/0073788 A1 | 3/2015 | Allauzen et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0082229 A1 | 3/2015 | Ouyang et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0095031 A1 | 4/2015 | Conkie et al. |
| 2015/0095278 A1 | 4/2015 | Flinn et al. |

(56) References Cited

U.S. PATENT DOCUMENTS

| | | |
|---|---|---|
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0113407 A1 | 4/2015 | Hoffert et al. |
| 2015/0120296 A1 | 4/2015 | Stern et al. |
| 2015/0120723 A1 | 4/2015 | Deshmukh et al. |
| 2015/0121216 A1 | 4/2015 | Brown et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162001 A1 | 6/2015 | Kar et al. |
| 2015/0163558 A1 | 6/2015 | Wheatley |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0179176 A1 | 6/2015 | Ryu et al. |
| 2015/0185964 A1 | 7/2015 | Stout |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0201077 A1 | 7/2015 | Konig et al. |
| 2015/0205858 A1 | 7/2015 | Xie et al. |
| 2015/0208226 A1 | 7/2015 | Kuusilinna et al. |
| 2015/0212791 A1 | 7/2015 | Kumar et al. |
| 2015/0213796 A1 | 7/2015 | Waltermann et al. |
| 2015/0215258 A1 | 7/2015 | Nowakowski et al. |
| 2015/0220507 A1 | 8/2015 | Mohajer et al. |
| 2015/0221304 A1 | 8/2015 | Stewart |
| 2015/0221307 A1 | 8/2015 | Shah et al. |
| 2015/0227505 A1 | 8/2015 | Morimoto |
| 2015/0227633 A1 | 8/2015 | Shapira |
| 2015/0228274 A1 | 8/2015 | Leppnen et al. |
| 2015/0228281 A1 | 8/2015 | Raniere |
| 2015/0230095 A1 | 8/2015 | Smith et al. |
| 2015/0234636 A1 | 8/2015 | Barnes, Jr. |
| 2015/0234800 A1 | 8/2015 | Patrick et al. |
| 2015/0242091 A1 | 8/2015 | Lu et al. |
| 2015/0243278 A1 | 8/2015 | Kibre et al. |
| 2015/0243283 A1 | 8/2015 | Halash et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0249715 A1* | 9/2015 | Helvik .................. H04L 67/22 709/204 |
| 2015/0253146 A1 | 9/2015 | Annapureddy et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0269139 A1 | 9/2015 | McAteer et al. |
| 2015/0269943 A1 | 9/2015 | VanBlon et al. |
| 2015/0277574 A1 | 10/2015 | Jain et al. |
| 2015/0278348 A1 | 10/2015 | Paruchuri et al. |
| 2015/0278370 A1 | 10/2015 | Stratver et al. |
| 2015/0278737 A1 | 10/2015 | Chen Huebscher et al. |
| 2015/0279358 A1 | 10/2015 | Kingsbury et al. |
| 2015/0279360 A1 | 10/2015 | Mengibar et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0287401 A1 | 10/2015 | Lee et al. |
| 2015/0287409 A1 | 10/2015 | Jang |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0295915 A1 | 10/2015 | Xiu |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0309997 A1 | 10/2015 | Lee et al. |
| 2015/0310114 A1 | 10/2015 | Ryger et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0312182 A1 | 10/2015 | Langholz |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0324041 A1 | 11/2015 | Varley et al. |
| 2015/0324334 A1 | 11/2015 | Lee et al. |
| 2015/0324362 A1* | 11/2015 | Glass ................ G06F 16/24578 707/725 |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340042 A1 | 11/2015 | Sejnoha et al. |
| 2015/0341717 A1 | 11/2015 | Song et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347385 A1 | 12/2015 | Flor et al. |
| 2015/0347393 A1 | 12/2015 | Futrell et al. |
| 2015/0347733 A1 | 12/2015 | Tsou et al. |
| 2015/0347985 A1 | 12/2015 | Gross et al. |
| 2015/0348547 A1 | 12/2015 | Paulik et al. |
| 2015/0348548 A1 | 12/2015 | Piernot et al. |

(56) References Cited

U.S. PATENT DOCUMENTS

| | | |
|---|---|---|
| 2015/0348549 A1 | 12/2015 | Giuli et al. |
| 2015/0348551 A1 | 12/2015 | Gruber et al. |
| 2015/0348554 A1 | 12/2015 | Orr |
| 2015/0348555 A1 | 12/2015 | Sugita |
| 2015/0349934 A1 | 12/2015 | Pollack et al. |
| 2015/0350031 A1 | 12/2015 | Burks et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thorn |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371665 A1 | 12/2015 | Naik et al. |
| 2015/0373183 A1 | 12/2015 | Woolsey et al. |
| 2015/0379414 A1 | 12/2015 | Yeh et al. |
| 2015/0379993 A1 | 12/2015 | Subhojit et al. |
| 2015/0382047 A1 | 12/2015 | Napolitano et al. |
| 2015/0382079 A1 | 12/2015 | Lister et al. |
| 2015/0382147 A1 | 12/2015 | Clark et al. |
| 2016/0004690 A1 | 1/2016 | Bangalore et al. |
| 2016/0005320 A1 | 1/2016 | deCharms et al. |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0036953 A1 | 2/2016 | Lee et al. |
| 2016/0042735 A1 | 2/2016 | Vibbert et al. |
| 2016/0042748 A1 | 2/2016 | Jain et al. |
| 2016/0048666 A1 | 2/2016 | Dey et al. |
| 2016/0055422 A1 | 2/2016 | Li |
| 2016/0062605 A1 | 3/2016 | Agarwal et al. |
| 2016/0063998 A1 | 3/2016 | Krishnamoorthy et al. |
| 2016/0070581 A1 | 3/2016 | Soon-Shiong |
| 2016/0071516 A1 | 3/2016 | Lee et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0086116 A1 | 3/2016 | Rao et al. |
| 2016/0091967 A1 | 3/2016 | Prokofieva et al. |
| 2016/0092447 A1 | 3/2016 | Venkataraman et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094979 A1 | 3/2016 | Naik et al. |
| 2016/0098991 A1 | 4/2016 | Luo et al. |
| 2016/0104480 A1 | 4/2016 | Sharifi |
| 2016/0104486 A1 | 4/2016 | Penilla et al. |
| 2016/0111091 A1 | 4/2016 | Bakish |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten |
| 2016/0148610 A1 | 5/2016 | Kennewick, Jr. et al. |
| 2016/0150020 A1 | 5/2016 | Farmer et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0162456 A1 | 6/2016 | Munro et al. |
| 2016/0163311 A1 | 6/2016 | Crook et al. |
| 2016/0163312 A1 | 6/2016 | Henton et al. |
| 2016/0170966 A1 | 6/2016 | Kolo |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189717 A1 | 6/2016 | Kannan et al. |
| 2016/0198319 A1 | 7/2016 | Huang et al. |
| 2016/0210551 A1 | 7/2016 | Lee et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224559 A1* | 8/2016 | Hicks ............... G06F 16/24578 |
| 2016/0224774 A1 | 8/2016 | Pender |
| 2016/0225372 A1 | 8/2016 | Cheung et al. |
| 2016/0239645 A1 | 8/2016 | Heo et al. |
| 2016/0240187 A1 | 8/2016 | Fleizach et al. |
| 2016/0240189 A1 | 8/2016 | Lee et al. |
| 2016/0247061 A1 | 8/2016 | Trask et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labsk et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293168 A1 | 10/2016 | Chen |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0307566 A1 | 10/2016 | Bellegarda |
| 2016/0313906 A1 | 10/2016 | Kilchenko et al. |
| 2016/0314788 A1 | 10/2016 | Jitkoff et al. |
| 2016/0314792 A1 | 10/2016 | Alvarez et al. |
| 2016/0315996 A1 | 10/2016 | Ha et al. |
| 2016/0317924 A1 | 11/2016 | Tanaka et al. |
| 2016/0321239 A1 | 11/2016 | Iso-sipilä et al. |
| 2016/0321261 A1 | 11/2016 | Spasojevic et al. |
| 2016/0322045 A1 | 11/2016 | Hatfeild et al. |
| 2016/0322048 A1 | 11/2016 | Amano et al. |
| 2016/0322050 A1 | 11/2016 | Wang et al. |
| 2016/0328205 A1 | 11/2016 | Agrawal et al. |
| 2016/0328893 A1 | 11/2016 | Cordova et al. |

(56) References Cited

U.S. PATENT DOCUMENTS

| | | |
|---|---|---|
| 2016/0336007 A1 | 11/2016 | Hanazawa |
| 2016/0336010 A1 | 11/2016 | Lindahl |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342685 A1 | 11/2016 | Basu et al. |
| 2016/0342781 A1 | 11/2016 | Jeon |
| 2016/0351190 A1 | 12/2016 | Binder et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carthian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379633 A1 | 12/2016 | Lehman et al. |
| 2016/0379641 A1 | 12/2016 | Liu et al. |
| 2017/0000348 A1* | 1/2017 | Karsten .................. A61B 5/681 |
| 2017/0003931 A1 | 1/2017 | Dvortsov et al. |
| 2017/0004824 A1 | 1/2017 | Yoo et al. |
| 2017/0011091 A1 | 1/2017 | Chehreghani |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0018271 A1 | 1/2017 | Khan et al. |
| 2017/0019987 A1 | 1/2017 | Dragone et al. |
| 2017/0025124 A1 | 1/2017 | Mixter et al. |
| 2017/0031576 A1 | 2/2017 | Saoji et al. |
| 2017/0032783 A1 | 2/2017 | Lord et al. |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0053652 A1 | 2/2017 | Choi et al. |
| 2017/0055895 A1 | 3/2017 | Des Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0084277 A1 | 3/2017 | Sharifi |
| 2017/0085547 A1 | 3/2017 | De Aguiar et al. |
| 2017/0090569 A1 | 3/2017 | Levesque |
| 2017/0091168 A1 | 3/2017 | Bellegarda et al. |
| 2017/0091612 A1 | 3/2017 | Gruber et al. |
| 2017/0092270 A1 | 3/2017 | Newendorp et al. |
| 2017/0092278 A1 | 3/2017 | Evermann et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0116177 A1 | 4/2017 | Walia |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0140052 A1* | 5/2017 | Bufe, III .................. H04L 67/22 |
| 2017/0140644 A1 | 5/2017 | Hwang et al. |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0155940 A1 | 6/2017 | Ji et al. |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0169818 A1 | 6/2017 | VanBlon et al. |
| 2017/0169819 A1 | 6/2017 | Mese et al. |
| 2017/0177547 A1 | 6/2017 | Ciereszko et al. |
| 2017/0178619 A1 | 6/2017 | Naik et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0193083 A1 | 7/2017 | Bhatt et al. |
| 2017/0195493 A1 | 7/2017 | Sudarsan et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0206899 A1 | 7/2017 | Bryant et al. |
| 2017/0215052 A1 | 7/2017 | Koum et al. |
| 2017/0221486 A1 | 8/2017 | Kurata et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0230429 A1 | 8/2017 | Garmark et al. |
| 2017/0230709 A1 | 8/2017 | Van Os et al. |
| 2017/0236512 A1 | 8/2017 | Williams et al. |
| 2017/0236514 A1 | 8/2017 | Nelson |
| 2017/0242653 A1 | 8/2017 | Lang et al. |
| 2017/0242657 A1 | 8/2017 | Jarvis et al. |
| 2017/0243468 A1 | 8/2017 | Dotan-Cohen et al. |
| 2017/0243586 A1 | 8/2017 | Civelli et al. |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0264711 A1 | 9/2017 | Natarajan et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0295446 A1 | 10/2017 | Thagadur Shivappa |
| 2017/0311005 A1 | 10/2017 | Lin |
| 2017/0316775 A1 | 11/2017 | Le et al. |
| 2017/0316782 A1 | 11/2017 | Haughay et al. |
| 2017/0323637 A1 | 11/2017 | Naik |
| 2017/0329490 A1 | 11/2017 | Esinovskaya et al. |
| 2017/0329572 A1 | 11/2017 | Shah et al. |
| 2017/0345411 A1 | 11/2017 | Raitio et al. |
| 2017/0345420 A1 | 11/2017 | Barnett, Jr. |
| 2017/0346949 A1 | 11/2017 | Sanghavi et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0365251 A1 | 12/2017 | Park et al. |
| 2017/0371885 A1 | 12/2017 | Aggarwal et al. |
| 2017/0374093 A1 | 12/2017 | Dhar et al. |
| 2018/0005112 A1 | 1/2018 | Iso-sipila et al. |

(56) References Cited

U.S. PATENT DOCUMENTS

| | | |
|---|---|---|
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0025124 A1* | 1/2018 | Mohr .................. G06F 3/048 705/2 |
| 2018/0033431 A1 | 2/2018 | Newendorp et al. |
| 2018/0046340 A1* | 2/2018 | Mall .................... H04L 67/22 |
| 2018/0047406 A1 | 2/2018 | Park |
| 2018/0054505 A1 | 2/2018 | Hart et al. |
| 2018/0060032 A1 | 3/2018 | Boesen |
| 2018/0060312 A1 | 3/2018 | Won |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063624 A1 | 3/2018 | Boesen |
| 2018/0067914 A1 | 3/2018 | Chen et al. |
| 2018/0067918 A1 | 3/2018 | Bellegarda et al. |
| 2018/0069743 A1 | 3/2018 | Bakken et al. |
| 2018/0075847 A1 | 3/2018 | Lee et al. |
| 2018/0088969 A1 | 3/2018 | Vanblon et al. |
| 2018/0089166 A1 | 3/2018 | Meyer et al. |
| 2018/0090143 A1 | 3/2018 | Saddler et al. |
| 2018/0096683 A1 | 4/2018 | James et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0122376 A1 | 5/2018 | Kojima |
| 2018/0122378 A1 | 5/2018 | Mixter et al. |
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0143967 A1 | 5/2018 | Anbazhagan et al. |
| 2018/0144748 A1 | 5/2018 | Leong |
| 2018/0150744 A1 | 5/2018 | Orr et al. |
| 2018/0157372 A1 | 6/2018 | Kurabayashi |
| 2018/0157992 A1 | 6/2018 | Susskind et al. |
| 2018/0174406 A1 | 6/2018 | Arashi et al. |
| 2018/0174597 A1 | 6/2018 | Lee et al. |
| 2018/0182376 A1 | 6/2018 | Van Gysel et al. |
| 2018/0190273 A1 | 7/2018 | Karimli et al. |
| 2018/0196683 A1 | 7/2018 | Radebaugh et al. |
| 2018/0213448 A1 | 7/2018 | Segal et al. |
| 2018/0218735 A1 | 8/2018 | Hunt et al. |
| 2018/0232203 A1 | 8/2018 | Gelfenbeyn et al. |
| 2018/0253209 A1 | 9/2018 | Jaygarl et al. |
| 2018/0253652 A1 | 9/2018 | Palzer et al. |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0278740 A1 | 9/2018 | Choi et al. |
| 2018/0293984 A1 | 10/2018 | Lindahl |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0314552 A1 | 11/2018 | Kim et al. |
| 2018/0322112 A1 | 11/2018 | Bellegarda et al. |
| 2018/0322881 A1 | 11/2018 | Min et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0336184 A1 | 11/2018 | Bellegarda et al. |
| 2018/0336275 A1 | 11/2018 | Graham et al. |
| 2018/0336449 A1 | 11/2018 | Adan et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336920 A1 | 11/2018 | Bastian et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0350345 A1 | 12/2018 | Naik |
| 2018/0350353 A1 | 12/2018 | Gruber et al. |
| 2018/0357308 A1 | 12/2018 | Cheyer |
| 2018/0358015 A1 | 12/2018 | Cash et al. |
| 2018/0366105 A1 | 12/2018 | Kim |
| 2018/0373487 A1 | 12/2018 | Gruber et al. |
| 2018/0374484 A1 | 12/2018 | Huang et al. |
| 2019/0012141 A1 | 1/2019 | Piersol et al. |
| 2019/0012449 A1 | 1/2019 | Cheyer |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0034040 A1 | 1/2019 | Shah et al. |
| 2019/0034826 A1 | 1/2019 | Ahmad et al. |
| 2019/0035405 A1 | 1/2019 | Haughay |
| 2019/0045040 A1 | 2/2019 | Lee et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0080685 A1 | 3/2019 | Johnson, Jr. |
| 2019/0087412 A1 | 3/2019 | Seyed Ibrahim et al. |
| 2019/0095050 A1 | 3/2019 | Gruber et al. |
| 2019/0095171 A1 | 3/2019 | Carson et al. |
| 2019/0102378 A1 | 4/2019 | Piernot et al. |
| 2019/0103112 A1 | 4/2019 | Walker et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0147880 A1 | 5/2019 | Booker et al. |
| 2019/0164546 A1 | 5/2019 | Piernot et al. |
| 2019/0172467 A1 | 6/2019 | Kim et al. |
| 2019/0179890 A1 | 6/2019 | Evermann |
| 2019/0189118 A1 | 6/2019 | Piernot et al. |
| 2019/0189125 A1 | 6/2019 | Van Os et al. |
| 2019/0197053 A1 | 6/2019 | Graham et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0236130 A1 | 8/2019 | Li et al. |
| 2019/0236459 A1 | 8/2019 | Cheyer et al. |
| 2019/0244618 A1 | 8/2019 | Newendorp et al. |
| 2019/0259386 A1 | 8/2019 | Kudurshian et al. |

FOREIGN PATENT DOCUMENTS

| | | |
|---|---|---|
| AU | 2015101171 A4 | 10/2015 |
| AU | 2018100187 A4 | 3/2018 |
| CA | 2694314 A1 | 8/2010 |
| CA | 2792412 A1 | 7/2011 |
| CA | 2666438 C | 6/2013 |
| CN | 101388012 A | 3/2009 |
| CN | 101416471 A | 4/2009 |
| CN | 101427244 A | 5/2009 |
| CN | 101448340 A | 6/2009 |
| CN | 101453498 A | 6/2009 |
| CN | 101499156 A | 8/2009 |
| CN | 101500041 A | 8/2009 |
| CN | 101515952 A | 8/2009 |
| CN | 101535983 A | 9/2009 |
| CN | 101547396 A | 9/2009 |
| CN | 101557432 A | 10/2009 |
| CN | 101601088 A | 12/2009 |

(56) References Cited

FOREIGN PATENT DOCUMENTS

| | | |
|---|---|---|
| CN | 101604521 A | 12/2009 |
| CN | 101632316 A | 1/2010 |
| CN | 101636736 A | 1/2010 |
| CN | 101667424 A | 3/2010 |
| CN | 101673544 A | 3/2010 |
| CN | 101751387 A | 6/2010 |
| CN | 101833286 A | 9/2010 |
| CN | 101847405 A | 9/2010 |
| CN | 101894547 A | 11/2010 |
| CN | 101930789 A | 12/2010 |
| CN | 101939740 A | 1/2011 |
| CN | 101951553 A | 1/2011 |
| CN | 101971250 A | 2/2011 |
| CN | 102056026 A | 5/2011 |
| CN | 102137085 A | 7/2011 |
| CN | 102137193 A | 7/2011 |
| CN | 102160043 A | 8/2011 |
| CN | 102201235 A | 9/2011 |
| CN | 102214187 A | 10/2011 |
| CN | 102237088 A | 11/2011 |
| CN | 102246136 A | 11/2011 |
| CN | 202035047 U | 11/2011 |
| CN | 102282609 A | 12/2011 |
| CN | 202092650 U | 12/2011 |
| CN | 102368256 A | 3/2012 |
| CN | 102405463 A | 4/2012 |
| CN | 102498457 A | 6/2012 |
| CN | 102510426 A | 6/2012 |
| CN | 102629246 A | 8/2012 |
| CN | 102651217 A | 8/2012 |
| CN | 102682769 A | 9/2012 |
| CN | 102682771 A | 9/2012 |
| CN | 102685295 A | 9/2012 |
| CN | 102693725 A | 9/2012 |
| CN | 202453859 U | 9/2012 |
| CN | 102722478 A | 10/2012 |
| CN | 102750087 A | 10/2012 |
| CN | 102792320 A | 11/2012 |
| CN | 102801853 A | 11/2012 |
| CN | 102870065 A | 1/2013 |
| CN | 102882752 A | 1/2013 |
| CN | 102917004 A | 2/2013 |
| CN | 102917271 A | 2/2013 |
| CN | 102918493 A | 2/2013 |
| CN | 103035240 A | 4/2013 |
| CN | 103035251 A | 4/2013 |
| CN | 103038728 A | 4/2013 |
| CN | 103093334 A | 5/2013 |
| CN | 103135916 A | 6/2013 |
| CN | 103198831 A | 7/2013 |
| CN | 103209369 A | 7/2013 |
| CN | 103226949 A | 7/2013 |
| CN | 103236260 A | 8/2013 |
| CN | 103292437 A | 9/2013 |
| CN | 103365279 A | 10/2013 |
| CN | 103390016 A | 11/2013 |
| CN | 103455234 A | 12/2013 |
| CN | 103562863 A | 2/2014 |
| CN | 103744761 A | 4/2014 |
| CN | 103760984 A | 4/2014 |
| CN | 103792985 A | 5/2014 |
| CN | 103795850 A | 5/2014 |
| CN | 103841268 A | 6/2014 |
| CN | 103930945 A | 7/2014 |
| CN | 104038621 A | 9/2014 |
| CN | 104090652 A | 10/2014 |
| CN | 104113471 A | 10/2014 |
| CN | 104144377 A | 11/2014 |
| CN | 104281259 A | 1/2015 |
| CN | 104284257 A | 1/2015 |
| CN | 104335234 A | 2/2015 |
| CN | 104423625 A | 3/2015 |
| CN | 104463552 A | 3/2015 |
| CN | 104516522 A | 4/2015 |
| CN | 104854583 A | 8/2015 |
| CN | 104951077 A | 9/2015 |
| CN | 105100356 A | 11/2015 |
| CN | 105247511 A | 1/2016 |
| CN | 105264524 A | 1/2016 |
| CN | 105471705 A | 4/2016 |
| CN | 105556592 A | 5/2016 |
| CN | 105869641 A | 8/2016 |
| CN | 106030699 A | 10/2016 |
| CN | 106062734 A | 10/2016 |
| CN | 106462383 A | 2/2017 |
| CN | 107919123 A | 4/2018 |
| DE | 102008024258 A1 | 11/2009 |
| DE | 202016008226 U1 | 5/2017 |
| EP | 1909263 B1 | 1/2009 |
| EP | 1335620 B1 | 3/2009 |
| EP | 2069895 A1 | 6/2009 |
| EP | 2081185 A1 | 7/2009 |
| EP | 2094032 A1 | 8/2009 |
| EP | 2096840 A1 | 9/2009 |
| EP | 2107553 A1 | 10/2009 |
| EP | 2109295 A1 | 10/2009 |
| EP | 1720375 B1 | 7/2010 |
| EP | 2205010 A1 | 7/2010 |
| EP | 2309491 A1 | 4/2011 |
| EP | 2329348 | 6/2011 |
| EP | 2339576 A2 | 6/2011 |
| EP | 2355093 A2 | 8/2011 |
| EP | 2400373 A1 | 12/2011 |
| EP | 2431842 A2 | 3/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2669889 A2 | 12/2013 |
| EP | 2683175 A1 | 1/2014 |
| EP | 2733598 A2 | 5/2014 |
| EP | 2760015 A1 | 7/2014 |
| EP | 2801890 A1 | 11/2014 |
| EP | 2801972 A1 | 11/2014 |
| EP | 2824564 A1 | 1/2015 |
| EP | 2849177 A1 | 3/2015 |
| EP | 2930715 A1 | 10/2015 |
| EP | 2938022 A1 | 10/2015 |
| EP | 2940556 A1 | 11/2015 |
| EP | 2950307 A1 | 12/2015 |
| EP | 2985984 A2 | 2/2016 |
| EP | 3035329 A1 | 6/2016 |
| EP | 3125097 A2 | 2/2017 |
| EP | 3224708 A1 | 10/2017 |
| EP | 3246916 A1 | 11/2017 |
| EP | 3300074 A1 | 3/2018 |
| EP | 2983065 B1 | 8/2018 |
| JP | 2009-2850 A | 1/2009 |
| JP | 2009-503623 A | 1/2009 |
| JP | 2009-36999 A | 2/2009 |
| JP | 2009-505142 A | 2/2009 |
| JP | 2009-47920 A | 3/2009 |
| JP | 2009-60512 A | 3/2009 |
| JP | 2009-069062 A | 4/2009 |
| JP | 2009-98490 A | 5/2009 |
| JP | 2009-110300 A | 5/2009 |
| JP | 2009-116841 A | 5/2009 |
| JP | 2009-134409 A | 6/2009 |
| JP | 2009-140444 A | 6/2009 |
| JP | 2009-169470 A | 7/2009 |
| JP | 2009-177440 A | 8/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-223840 A | 10/2009 |
| JP | 2009-294913 A | 12/2009 |
| JP | 2009-294946 A | 12/2009 |
| JP | 2009-543166 A | 12/2009 |
| JP | 2010-66519 A | 3/2010 |
| JP | 2010-78979 A | 4/2010 |
| JP | 2010-108378 A | 5/2010 |

(56) References Cited

FOREIGN PATENT DOCUMENTS

| | | |
|---|---|---|
| JP | 2010-518475 A | 5/2010 |
| JP | 2010-518526 A | 5/2010 |
| JP | 2010-146347 A | 7/2010 |
| JP | 2010-157207 A | 7/2010 |
| JP | 2010-166478 A | 7/2010 |
| JP | 2010-205111 A | 9/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-238022 A | 11/2011 |
| JP | 2011-250027 A | 12/2011 |
| JP | 2012-014394 A | 1/2012 |
| JP | 2012-33997 A | 2/2012 |
| JP | 2012-508530 A | 4/2012 |
| JP | 2012-089020 A | 5/2012 |
| JP | 2012-116442 A | 6/2012 |
| JP | 2012-142744 A | 7/2012 |
| JP | 2012-147063 A | 8/2012 |
| JP | 2012-518847 A | 8/2012 |
| JP | 2013-37688 A | 2/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-080476 A | 5/2013 |
| JP | 2013-517566 A | 5/2013 |
| JP | 2013-134430 A | 7/2013 |
| JP | 2013-140520 A | 7/2013 |
| JP | 2013-527947 A | 7/2013 |
| JP | 2013-528012 A | 7/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2013-258600 A | 12/2013 |
| JP | 2014-2586 A | 1/2014 |
| JP | 2014-10688 A | 1/2014 |
| JP | 2014-026629 A | 2/2014 |
| JP | 2014-60600 A | 4/2014 |
| JP | 2014-72586 A | 4/2014 |
| JP | 2014-077969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-145842 A | 8/2014 |
| JP | 2014-146940 A | 8/2014 |
| JP | 2014-150323 A | 8/2014 |
| JP | 2014-222514 A | 11/2014 |
| JP | 2015-8001 A | 1/2015 |
| JP | 2015-18365 A | 1/2015 |
| JP | 2015-501022 A | 1/2015 |
| JP | 2015-41845 A | 3/2015 |
| JP | 2015-81971 A | 4/2015 |
| JP | 2015-94848 A | 5/2015 |
| JP | 2015-519675 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2017-19331 A | 1/2017 |
| JP | 2018-525950 A | 9/2018 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0053149 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0031283 A | 3/2014 |
| KR | 10-2014-0033574 A | 3/2014 |
| KR | 10-2014-0055204 A | 5/2014 |
| KR | 10-2014-0106715 A | 9/2014 |
| KR | 10-2014-0147557 A | 12/2014 |
| KR | 10-2015-0013631 A | 2/2015 |
| KR | 10-2015-0038375 A | 4/2015 |
| KR | 10-2015-0043512 A | 4/2015 |
| KR | 10-2016-0004351 A | 1/2016 |
| KR | 10-2016-0010523 A | 1/2016 |
| KR | 10-2016-0040279 A | 4/2016 |
| KR | 10-2016-0101198 A | 8/2016 |
| KR | 10-2017-0036805 A | 4/2017 |
| RU | 2349970 C2 | 3/2009 |
| RU | 2353068 C2 | 4/2009 |
| RU | 2364917 C2 | 8/2009 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 201142823 A1 | 12/2011 |
| TW | 201227715 A1 | 7/2012 |
| TW | 201245989 A1 | 11/2012 |
| TW | 201312548 A1 | 3/2013 |
| WO | 2009/009240 A2 | 1/2009 |
| WO | 2009/016631 A2 | 2/2009 |
| WO | 2009/017280 A1 | 2/2009 |
| WO | 2909/034686 A1 | 3/2009 |
| WO | 2009/075912 A1 | 6/2009 |
| WO | 2909/104126 A1 | 8/2009 |
| WO | 2909/156438 A1 | 12/2009 |
| WO | 2909/156978 A1 | 12/2009 |
| WO | 2010/013369 A1 | 2/2010 |
| WO | 2010/054373 A2 | 5/2010 |
| WO | 2010/100937 A1 | 9/2010 |
| WO | 2010/141802 A1 | 12/2010 |
| WO | 2019/144651 A2 | 12/2010 |
| WO | 2011/028842 A2 | 3/2011 |
| WO | 2011/057346 A1 | 5/2011 |
| WO | 2011/060106 A1 | 5/2011 |
| WO | 2011/088053 A2 | 7/2011 |

(56) References Cited

FOREIGN PATENT DOCUMENTS

| | | |
|---|---|---|
| WO | 2011/093025 A1 | 8/2011 |
| WO | 2911/116309 A1 | 9/2011 |
| WO | 2011/133543 A1 | 10/2011 |
| WO | 2011/150730 A1 | 12/2011 |
| WO | 2911/163350 A1 | 12/2011 |
| WO | 2911/088053 A3 | 1/2012 |
| WO | 2012/019020 A1 | 2/2012 |
| WO | 2012/019637 A1 | 2/2012 |
| WO | 2012/129231 A1 | 9/2012 |
| WO | 2012/135157 A2 | 10/2012 |
| WO | 2012/154317 A1 | 11/2012 |
| WO | 2012/155079 A2 | 11/2012 |
| WO | 2012/167168 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/163113 A1 | 10/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/021967 A1 | 2/2014 |
| WO | 2014/022148 A1 | 2/2014 |
| WO | 2014/028797 A1 | 2/2014 |
| WO | 2014/031505 A1 | 2/2014 |
| WO | 2014/047047 A1 | 3/2014 |
| WO | 2014/066352 A1 | 5/2014 |
| WO | 2014/070872 A2 | 5/2014 |
| WO | 2014/078965 A1 | 5/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144579 A1 | 9/2014 |
| WO | 2014/159581 A1 | 10/2014 |
| WO | 2014/197336 A1 | 12/2014 |
| WO | 2014/200728 A1 | 12/2014 |
| WO | 2014/204659 A2 | 12/2014 |
| WO | 2015/018440 A1 | 2/2015 |
| WO | 2015/029379 A1 | 3/2015 |
| WO | 2015/030796 A1 | 3/2015 |
| WO | 2015/041892 A1 | 3/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/099939 A1 | 7/2015 |
| WO | 2015/116151 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/175354 A1 | 11/2016 |
| WO | 2016/190950 A1 | 12/2016 |
| WO | 2016/209444 A1 | 12/2016 |
| WO | 2017/044260 A1 | 3/2017 |
| WO | 2017/044629 A1 | 3/2017 |
| WO | 2017/053311 A1 | 3/2017 |
| WO | 2018/213415 A1 | 11/2018 |
| WO | 2010/075623 A1 | 7/2019 |

OTHER PUBLICATIONS

"Galaxy S7: How to Adjust Screen Timeout & Lock Screen Timeout", Available online at:—"https://www.youtube.com/watch?v=n6e1WKUS2ww", Jun. 9, 2016, 1 page.

"Hey Google: How to Create a Shopping List with Your Google Assistant", Available online at:—https://www.youtube.com/watch?v=w9NCsElax1Y, May 25, 2018, 1 page.

"How to Enable Google Assistant on Galaxy 57 and other Android Phones (No Root)", Available online at:—"https://www.youtube.com/watch?v=HeklQbWyksE", Mar. 20, 2017, 1 page.

"How to Use Ok Google Assistant Even Phone is Locked", Available online at:—"https://www.youtube.com/watch?v=9B_gP4j_SP8", Mar. 12, 2018, 1 page.

"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.

"Ask Alexa—Things That Are Smart Wiki", Available online at <URL:https://thingsthataresmart.wiki/index.php?title=Ask_Alexa&oldid=4283>, [retrieved from internet on Aug. 2, 2017], Jun. 8, 2016, pp. 1-31.

"DIRECTV™ Voice", Now Part of the DIRECTTV Mobile App for Phones, Sep. 18, 2013, 5 pages.

"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.

Adium, "About Adium—Adium X—Trac", available at <http://web.archive.org/web/20070819113247/http://trac.adiumx.com/wiki/AboutAdium>, retrieved on Nov. 25, 2011, 2 pages.

Alfred App, "Alfred", available at <http://www.alfredapp.com/>, retrieved on Feb. 8, 2012, 5 pages.

Anania, Peter, "Amazon Echo with Home Automation (Smartthings)", Available online at https://www.youtube.com/watch?v=LMW6aXmsWNE, Dec. 20, 2015, 1 page.

API.AI, "Android App Review—Speaktoit Assistant", Available at <https://www.youtube.com/watch?v=myE498nyfGw>, Mar. 30, 2011, 3 pages.

Apple, "VoiceOver", available at <http://www.apple.com/accessibility/voiceover/>, May 19, 2014, 3 pages.

Asakura et al., "What LG things; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR §1.98(a) (3)).

Ashbrook, Daniel L.., "Enabling Mobile Microinteractions", Retrieved from the Internet: URL: "http://danielashbrook.com/wp-content/uploads/2012/06/2009-Ashbrook-Thesis.pdf", May 2010, 186 pages.

Ashingtondctech & Gaming, "SwipeStatusBar—Reveal the Status Bar in a Fullscreen App", Online Available at: <https://www.youtube.com/watch?v=wA_1T9lAreQ>, Jul. 1, 2013, 3 pages.

Bellegarda, Jerome R., "Chapter 1: Spoken Language Understanding for Natural Interaction: The Siri Experience", Natural Interaction with Robots, Knowbots and Smartphones, 2014, pp. 3-14.

Bellegarda, Jerome, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS) 2012, May 2012, pp. 1-43.

Berry et al., "PTIME: Personalized Assistance for Calendaring", ACM Transactions on Intelligent Systems and Technology, vol. 2, No. 4, Article 40, Jul. 2011, pp. 1-22.

Bertulucci, Jeff, "Google Adds Voice Search to Chrome Browser", PC World, Jun. 14, 2011, 5 pages.

(56) References Cited

OTHER PUBLICATIONS

Bocchieri et al., "Use of Geographical Meta-Data in ASR Language and Acoustic Models", IEEE International Conference on Acoustics Speech and Signal Processing, 2010, pp. 5118-5121.
Burgess, Brian, "Amazon Echo Tip: Enable the Wake Up Sound", Available online at:—https://www.groovypost.com/howto/amazon-echo-tip-enable-wake-up-sound/, Jun. 30, 2015, 4 pages.
Butcher, Mike, "EVI Arrives in Town to go Toe-to-Toe with Siri", TechCrunch, Jan. 23, 2012, 2 pages.
Cambria et al., "Jumping NLP Curves: A Review of Natural Language Processing Research", IEEE Computational Intelligence Magazine, 2014, vol. 9, May 2014, pp. 48-57.
Caraballo et al., "Language Identification Based on a Discriminative Text Categorization Technique", Iberspeech 2012—Vii Jornadas En Tecnologia Del Habla And Iii Iberiansl Tech Workshop, Nov. 21, 2012, pp. 1-10.
Castleos, "Whole House Voice Control Demonstration", available online at: https://www.youtube.com/watch?v=9SRCoxrZ_W4, Jun. 2, 2012, 26 pages.
Chang et al., "Monaural Multi-Talker Speech Recognition with Attention Mechanism and Gated Convolutional Networks", Interspeech 2018, Sep. 2-6, 2018, pp. 1586-1590.
Chen et al., "Progressive Joint Modeling in Unsupervised Single-Channel Overlapped Speech Recognition", IEEE/ACM Transactions on Audion, Speech, and Language Processing, vol. 26, No. 1, Jan. 2018, pp. 184-196.
Chen, Yi, "Multimedia Siri Finds and Plays Whatever You Ask For", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Czech, Lucas, "A System for Recognizing Natural Spelling of English Words", Diploma Thesis, Karlsruhe Institute of Technology, May 7, 2014, 107 pages.
Deedeevuu, "Amazon Echo Alarm Feature", Available online at https://www.youtube.com/watch?v=fdjU8eRLk7c, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Earthling1984, "Samsung Galaxy Smart Stay Feature Explained", Available online at:—"https://www.youtube.com/watch?v=RpjBNtSjupI", May 29, 2013, 1 page.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Mannually Reviewed for the Search of U.S. Pat. No. 7,177,798, Mar. 22, 2013, 1 page.
Filipowicz, Luke, "How to use the Quick Type Keyboard in iOS 8", available online at <https://www.imore.com/comment/568232>, Oct. 11, 2014, pp. 1-17.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Finkel et al., "Joint Parsing and Named Entity Recognition", Human Language Technologies: The 2009 Annual Conference of the North American Chapter of the ACL, Jun. 2009, pp. 326-334.
Gannes, Liz, "Alfred App Gives Personalized Restaurant Recommendations", AllThingsD, Jul. 18, 2011, pp. 1-3.
Gasic et al., "Effective Handling of Dialogue State in the Hidden Information State Pomdp-based Dialogue Manager", ACM Transactions on Speech and Language Processing, May 2011, pp. 1-25.
Gomez et al., "Mouth Gesture and Voice Command Based Robot Command Interface", IEEE International Conference on Robotics and Automation, May 12-17, 2009, pp. 333-338.
Google Developers, "Voice Search in Your App", Available online at:—https://www.youtube.com/watch?v=PS1FbB5qWEI, Nov. 12, 2014, 1 page.
Gruber, Thomas R., et al., U.S. Appl. No. 61/186,414, filed Jun. 12, 2009 titled "System and Method for Semantic Auto-Completion"13 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Siri, A Virtual Personal Assistant-Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Gupta et al., "I-vector-based Speaker Adaptation of Deep Neural Networks for French Broadcast Audio Transcription", ICASSP, 2014, pp. 6334-6338.
Hardwar, Devindra, "Driving App Waze Builds its own Siri for Hands-Free Voice Control", Available online at <http://venturebeat.com/2012/02/09/driving-app-waza-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Headset Button Controller v7.3 APK Full APP Download for Android, Blackberry, iPhone, Jan. 27, 2014, 11 pages.
Hear voice from Google translate, Available on URL:https://www.youtube.com/watch?v=18AvMhFqD28, Jan. 28, 2011, 1 page.
Hershey et al., "Deep Clustering: Discriminative Embeddings for Segmentation and Separation", Proc. ICASSP, Mar. 2016, 6 pages.
IClarified, "How to Use Voice Control On Your iPhone 3GS", Online Available at: <https://www.iclarified.com/4296/how-to-use-voice-control-on-your-iphone-3g-s>, Jun. 19, 2009, 16 pages.
id3.org, "id3v2.4.0—Frames", available at <http://id3.org/id3v2.4.0-frames?action=print>, retrieved on Jan. 22, 2015, 41 pages.
Inews and Tech, "How To Use The QuickType Keyboard in iOS 8", Available online at:—"http://www.inewsandtech.com/how-to-use-the-quicktype-keyboard-in-ios-8/", Sep. 17, 2014, 6 pages.
Interactive Voice, available at <http://www.helloivee.com/company/>, retrieved on Feb. 10, 2014, 2 pages.
Internet Services and Social Net, "How to Search for Similar Websites", Retrieved from <https://www.youtube.com/watch?v=nLf2uirpt5s>see from 0:17 to 1:06, Jul. 4, 2013, 1 page.
IOS 8 Release, "Quick Type Keyboard on iOS 8 Makes Typing Easier", Retrieved from the Internet: URL:https://www.youtube.com/watch?v=0CidLR4fhVU, [Retrieved on Nov. 23, 2018], XP054978896, Jun. 3, 2014, 1 page.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Isik et al., "Single-Channel Multi-Speaker Separation using Deep Clustering", Interspeech 2016, Sep. 8-12, 2016, pp. 545-549.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jonsson et al, "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Karn, Ujjwal, "An Intuitive Explanation of Convolutional Neural Networks", The Data Science Blog, Aug. 11, 2016, 23 pages.

(56) References Cited

OTHER PUBLICATIONS

Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
King et al., "Robust Speech Recognition Via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 2013, pp. 442-451.
Lewis, Cameron, "Task Ave for iPhone Review", Mac Life, Available at <http://www.maclife.com/article/reviews/task_ave_iphone_review>, Mar. 3, 2011, 5 pages.
Liou et al., "Autoencoder for Words", Neurocomputing, vol. 139, Sep. 2014, pp. 84-96.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Marketing Land, "Amazon Echo: Play Music", Online Available at: <https://www.youtube.com/watch?v=A7V5NPbsXi4>, Apr. 27, 2015, 3 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mhatre et al., "Donna Interactive Chat-bot acting as a Personal Assistant", International Journal of Computer Applications (0975-8887), vol. 140, No. 10, Apr. 2016, 6 pages.
Microsoft, "Turn On and Use Magnifier", available at <http://www.microsoft.com/windowsxp/using/accessibility/magnifierturnon.mspx>, retrieved on Jun. 6, 2009.
Mikolov et al., "Linguistic Regularities in Continuous Space Word Representations", Proceedings of NAACL-HLT, Jun. 9-14, 2013, pp. 746-751.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang_32 1>, Sep. 27, 2012, 1 page.
Morrison, Jonathan, "iPhone 5 Siri Demo", Online Available at <https://www.youtube.com/watch?v=_wHWwG5lhWc>, Sep. 21, 2012, 3 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nakamura, Satoshi, "Overcoming the Language Barrier with Speech Translation Technology, Science & Technology Trends", Quarterly Review No. 31, Apr. 2009, pp. 36-49.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
Naone, Erica, "TR10: Intelligent Software Assistant", Technology Review, Mar.-Apr. 200, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Nozawa et al., "iPhone 4S Perfect Manual", vol. 1, First Edition, Nov. 11, 2011, 5 pages (Official Copy Only) (See Communication under 37 CFR § 1.98(a) (3)).
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).
OSXDAILY, "Get a List of Siri Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the Twenty-Second Conference on Innovated Applications of Artificial Intelligence, XP055114607, Jul. 11, 2010, pp. 1821-1826.
Pathak et al., "Privacy-preserving Speech Processing: Cryptographic and String-matching Frameworks Show Promise", In: IEEE signal processing magazine, retrieved from <http://www.merl.com/publications/doc/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMBLP), Oct. 25-29, 2014, pp. 1532-1543.
Perlow, Jason, "Alexa Loop Made With Playlist for Sleep Noise", Online Available at: <https://www.youtube.com/watch?v=nSkSuXzIJSg>, Apr. 11, 2016, 3 pages.
Phoenix Solutions, Inc., "Declaration of Christopher Schmandt Regarding the MIT Galazy System", West Interactive Corp., A Delaware Corporation, Document 40, Jul. 2, 2010, 162 pages.
Powell, Josh, "Now You See Me . . . Show/Hide Performance", available at http://www.learningjquery.com/2010/05/now-you-see-me-showhide-performance, May 4, 2010, 3 pages.
Qian et al., "Single-channel Multi-talker Speech Recognition With Permutation Invariant Training", Speech Communication, Issue 104, 2018, pp. 1-11.
Rios, Mafe, "New bar search for Facebook", Youtube, available at "https://www.youtube.com/watch?v=vwgN1WbvCas", Jul. 19, 2013, 2 pages.
Routines, "SmartThings Support", Available online at <https://web.archive.org/web/20151207165701/https://support.smartthings.com/hc/en-us/articles/205380034-Routines>, 2015, 2 pages.
Samsung Support, "Create a Quick Command in Bixby to Launch Custom Settings by at your Command", Retrieved from internet: https://www.facebook.com/samsungsupport/videos/10154746303151213, Nov. 13, 2017, 1 page.
Samsung, "SGH-a885 Series—Portable Quad-Band Mobile Phone—User Manual", Retrieved from the Internet: URL: "http://web.archive.org/web/20100106113758/http://www.comparecellular.com/images/phones/userguide1896.pdf", Jan. 1, 2009, 144 pages.
Sarawagi, Sunita, "CRF Package Page", available at <http://crf.sourceforge.net/>, retrieved on Apr. 6, 2011, 2 pages.
Seehafer, Brent, "Activate google assistant on Galaxy S7 with screen off", Available online at:—"https://productforums.google.com/forum/#!topic/websearch/lp3qIGBHLVI", Mar. 8, 2017, 4 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence with I-Vector Inputs", ICASSP, 2014, pp. 225-229.
Settle et al., "End-to-End Multi-Speaker Speech Recognition", Proc. ICASSP, Apr. 2018, 6 pages.

(56) References Cited

OTHER PUBLICATIONS

Simonite, Tom, "One Easy Way to Make Siri Smarter", Technology Review, Oct. 18, 2011, 2 pages.
Smith, Jake, "Amazon Alexa Calling: How to Set it up and Use it on Your Echo", iGeneration, May 30, 2017, 5 pages.
Speaker Recognition, Wikipedia, The Free Encyclopedia, Nov. 2, 2010, 4 pages.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/Interview-with-tom-gruber-of-siri>, Jan. 14, 2010, 5 pages.
SRI, "SRI Speech: Products: Software Development Kits: EduSpeak", available at <http://web.archive.org/web/20090628084033/http://www.speechatsri.com/products/eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling", IEEE Transactions to Audion, Speech, and Language Processing, 2015, vol. 23, Mar. 2015, pp. 517-529.
Sundermeyer et al., "LSTM Neural Networks for Language Modeling", Interspeech 2012, ISCA's 13 Annual Conference, Sep. 9-13, 2012, pp. 194-197.
Tan et al., "Knowledge Transfer in Permutation Invariant Training for Single-channel Multi-talker Speech Recognition", ICASSP 2018, 2018, pp. 5714-5718.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakToIt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Vaswani et al., "Attention is All You Need", 31st Conference on Neural Information Processing Systems (NIPS 2017), 2017, 11 pages.
Vlingo Incar, "Distracted Driving Solution with Vlingo Incar", YouTube Video, Available online at <http://www.youtube.com/watch?v=Vqs8XfXxgz4>, Oct. 2010, 2 pages.
Vodafone Deutschland, "Samsung Galaxy S3 Tastatur Spracheingabe", Available online at—"https://www.youtube.com/watch?v=6kOd6Gr8uFE", Aug. 22, 2012, 1 page.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Siri", Available At: URL: <https:jjen.wikipedia.orgjwjindex.php?title=Siri&oldid>, Nov. 8, 2015, 13 Pages.
Wikipedia, "Speech Recognition", available at <http://en.wikipedia.org/wiki/Speech_recognition>, retrieved on Sep. 14, 2011, 12 pages.
Wikipedia, "Virtual Assistant", Wkepedia, Online Available at : <https:jjen.wikipedia.orgjwjindex.php?title=Virtual assistant&oldid=679330666>, Sep. 3, 2015, 4 Pages.
Wikipedia, "Home Automation", Available At: https://en.wikipedia.org/w/index.php?titie= Home automation&oldid, Oct. 19, 2015, 9 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
X.AI, "How It Works", May 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Yan et al., "A Scalable Approach to Using DNN-Derived Features in GMM-HMM Based Acoustic Modeling for LVCSR", Interspeech, 2013, pp. 104-108.
Yates, Michael C., "How can I exit Google Assistant after I'm finished with it", Available online at:—"https://productforums.google.com/forum/#!msg/phone-by-google/faECnR2RJwA/gKNtOkQgAQAJ", Jan. 11, 2016, 2 pages.
Yeh, Jui-Feng, "Speech Act Identification Using Semantic Dependency Graphs With Probabilistic Context-free Grammars", ACM Transactions on Asian and Low-Resource Language Information Processing 15, No. 1, Article 5, Dec. 2015, pp. 5.1-5.28.
Young et al., "The Hidden Information State model: A practical framework for POMDP-based spoken dialogue management", Computer Speech & Language, vol. 24, Issue 2, 2010, pp. 150-174.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #-Tag in Twitter", Proceedings of the Workshop on Semantic Adaptive Socail Web, 2011, pp. 1-12.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.
Zmolikova et al., "Speaker-aware Neural Network Based Beamformer for Speaker Extraction in Speech Mixtures", Interspeech 2017, Aug. 20-24, 2017, pp. 2655-2659.

* cited by examiner

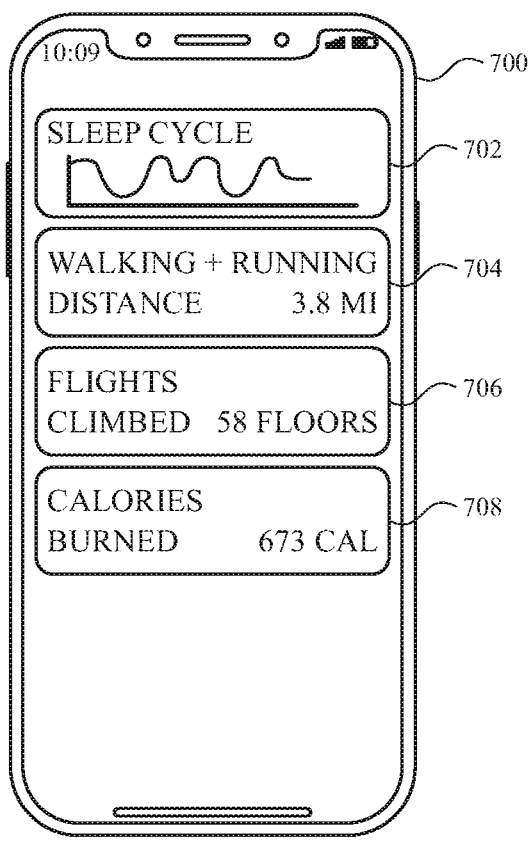 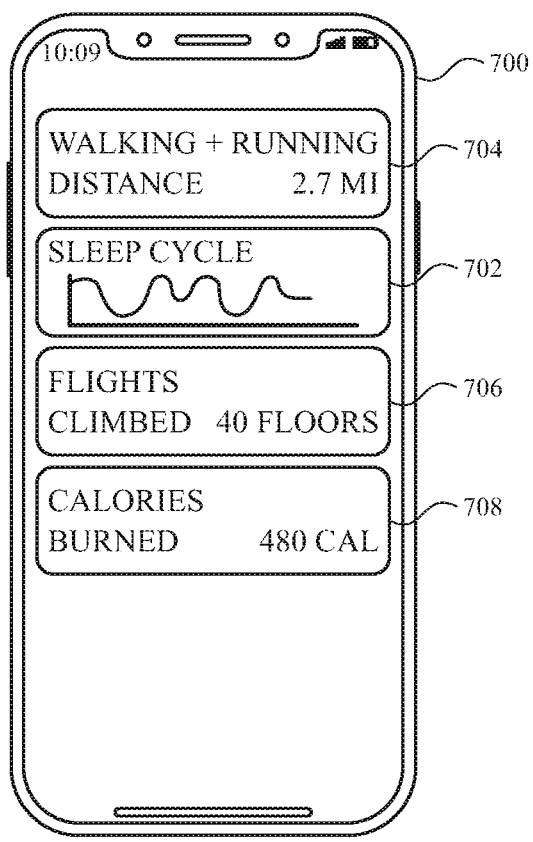
FIG. 7B                    FIG. 7C

INCREASING THE RELEVANCE OF NEW AVAILABLE INFORMATION

This Application claims priority to U.S. Provisional Patent Application No. 62/856,008, entitled "INCREASING THE RELEVANCE OF NEW AVAILABLE INFORMATION," filed on Jun. 1, 2019, the content of which is hereby incorporated by reference in its entirety.

FIELD

The present disclosure relates generally to determining the relevance of new available information for display in computer user interfaces

BACKGROUND

Computer user interfaces can display a large amount of available information. However, it is often undesirable or impracticable to display all available information, as computers may have limited screen sizes and/or displaying all available information may overwhelm a user. Accordingly, it may be desirable to selectively display a subset of all available information that is most relevant to a user.

BRIEF SUMMARY

An example process for determining the relevance of new available information includes at an electronic device with one or more processors and memory: detecting a new type of available information, the new type of available information being associated with a card for display in a content feed; in accordance with detecting the new type of available information, increasing a relevance score of the card above a display threshold; in accordance with increasing the relevance score above the display threshold: causing the card to be displayed in the content feed; and obtaining data representing user interaction with the displayed card; adjusting, based on the data representing user interaction with the displayed card, the relevance score; and modifying a display of the card in the content feed based on the adjusted relevance score.

In accordance with increasing the relevance score above the display threshold: causing the card to be displayed in the content feed and obtaining data representing user interaction with the displayed card may allow determination of the relevance of new available information (e.g., a new type of available information). In particular, models trained to determine the relevance of information for user presentation (e.g., in the form of a card) may perform poorly when determining the relevance of new available information. This may be because the model is trained to determine the relevance of information based on previous user interactions with the information, e.g., indicating user interest or disinterest in the information. However, limited or no data may be available regarding user interactions with new available information, e.g., because the information is new, and a user has had limited time to interact with it. Thus, the model may incorrectly determine that the new available information is not relevant, e.g., because the user has not interacted with the information. As a result, new available information may not be presented, even though the information may be relevant to a user.

However, by increasing a relevance score of a card associated with the new type of available information above a display threshold, the new type of available information may be displayed (e.g., in the form of a card). Displaying the new available information may allow collection of data representing user interactions with the new available information. Such data can advantageously be used to train a model to correctly determine the relevance of the new available information. Thus, if new available information is determined to be relevant, the information can be presented. In this manner, the user-device interface is made more efficient, (e.g., by informing a user of new available information (e.g., when the user would otherwise not be informed), by accurately determining and presenting relevant information to a user), which additionally reduces power usage and improves battery life of the device by enabling the user to use the device more quickly and efficiently.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-C illustrate various user interfaces ("UI") displayed by an electronic device, according to some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

This relates generally to increasing the relevance of new available information (e.g., so it is displayed) and determining the relevance of new available information (e.g., based on user interactions with the new information).

Figure 6:
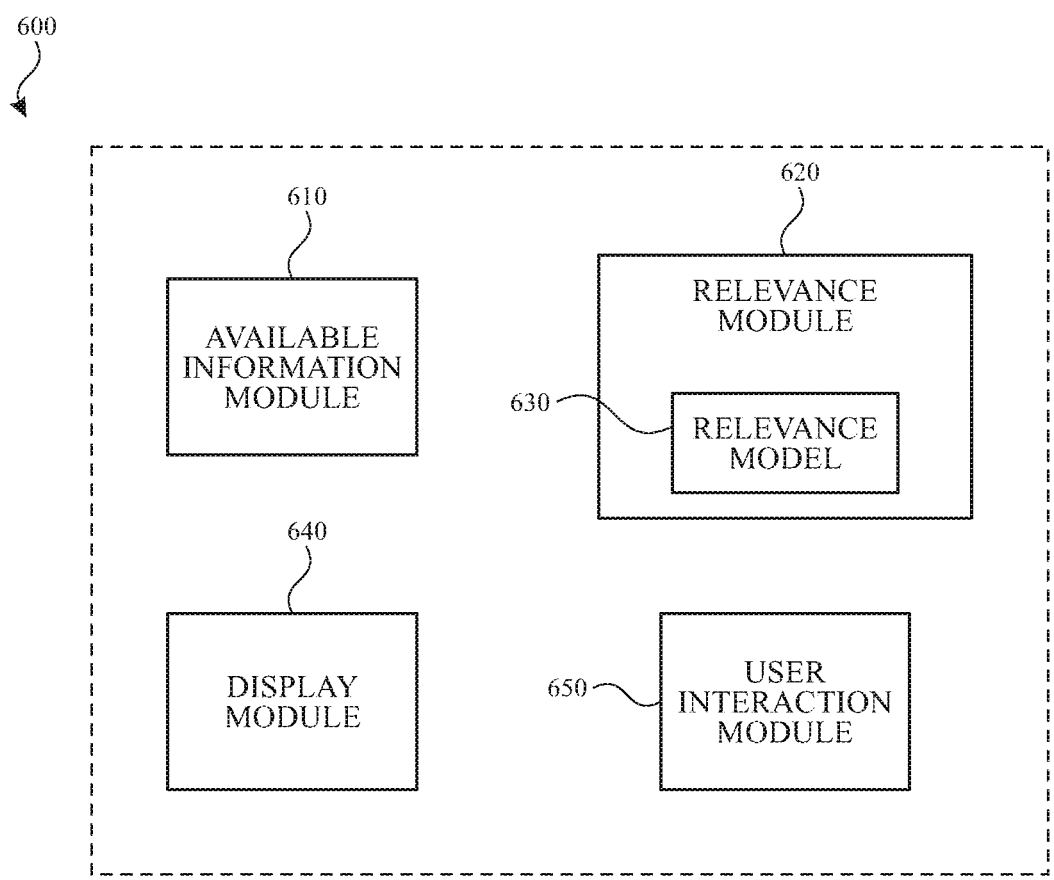
FIG. 6 illustrates a system for determining the relevance of new available information, according to some embodiments.
Figure 7A:
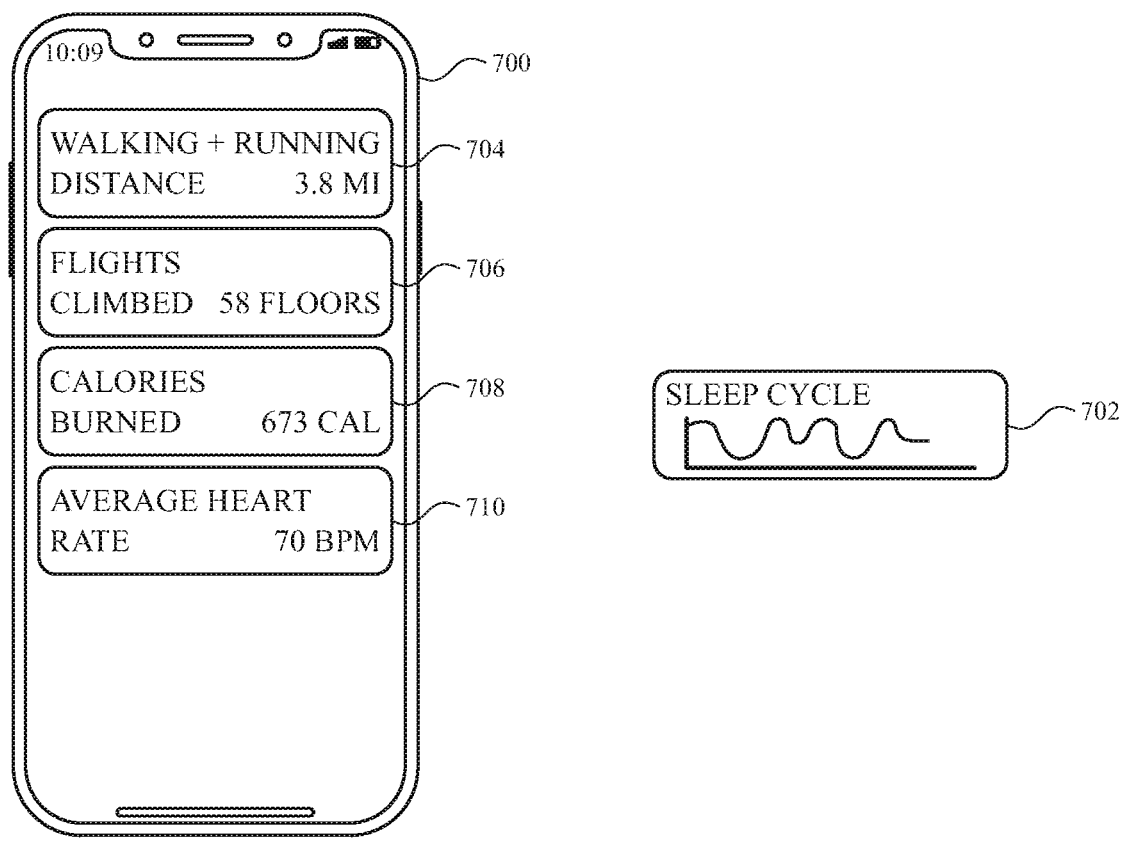
Figure 8A:
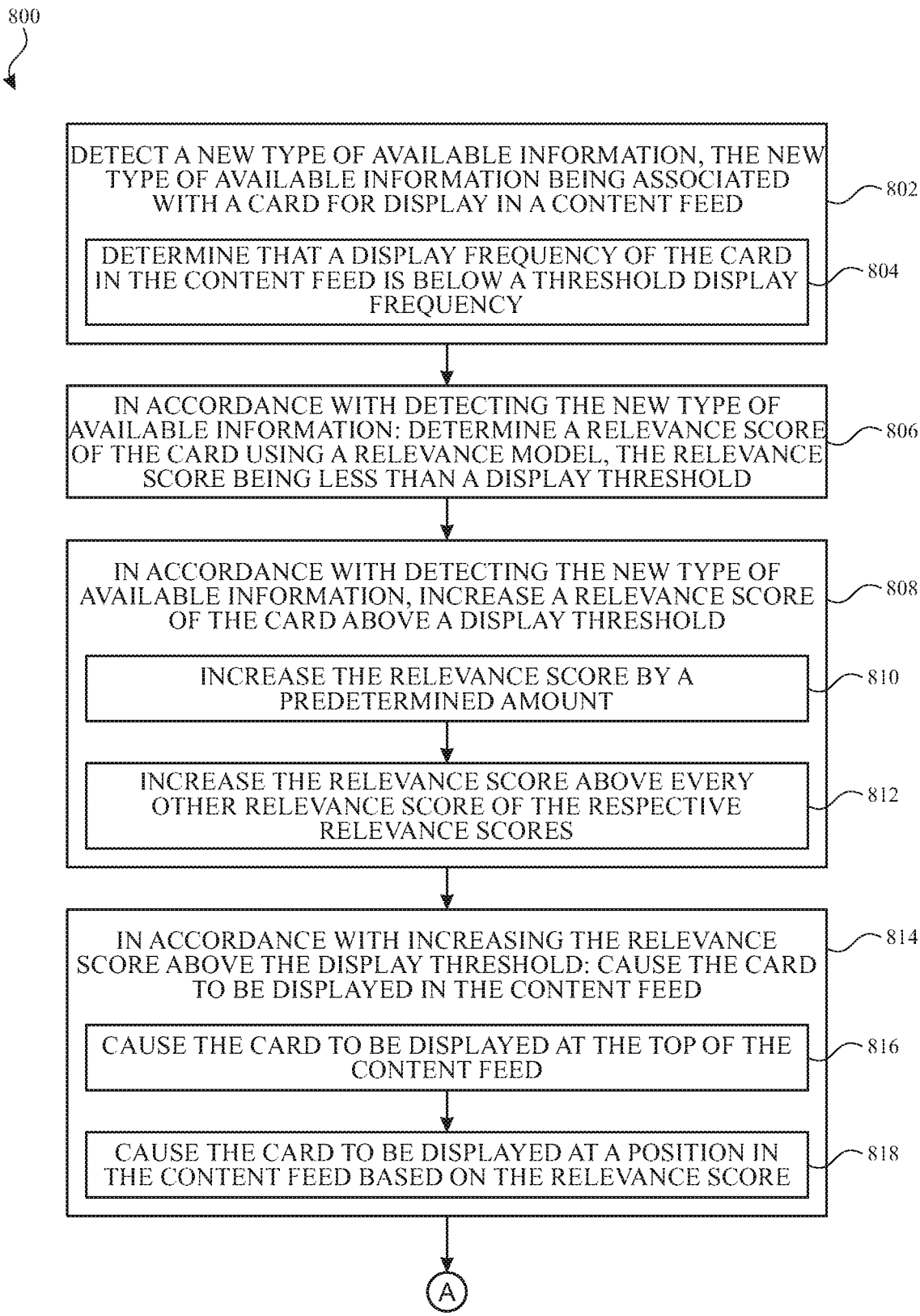
FIGS. 8A-C illustrate a flow diagram of a process for determining the relevance of new available information, according to some embodiments.
Figure 8B:
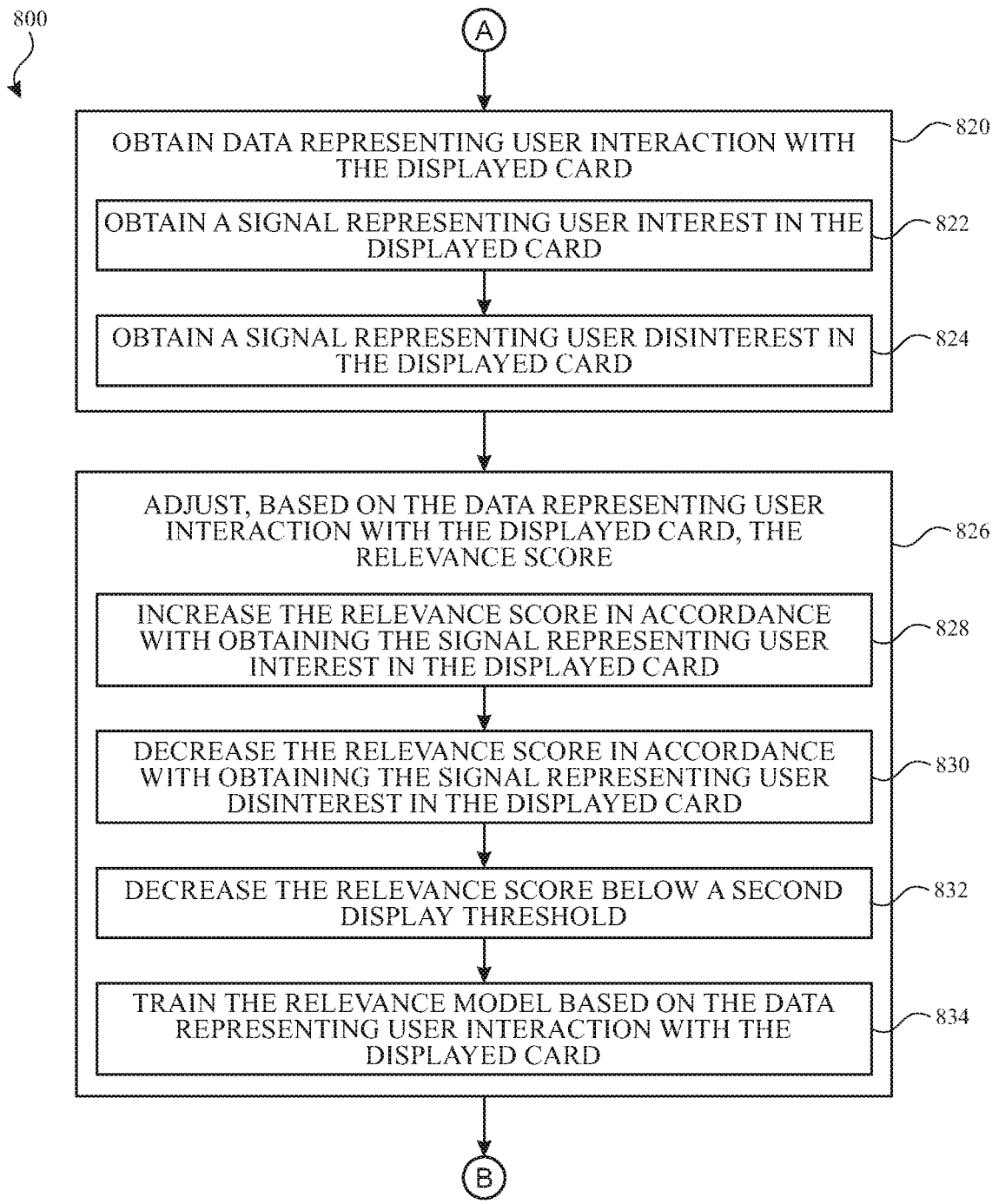
Figure 8C:
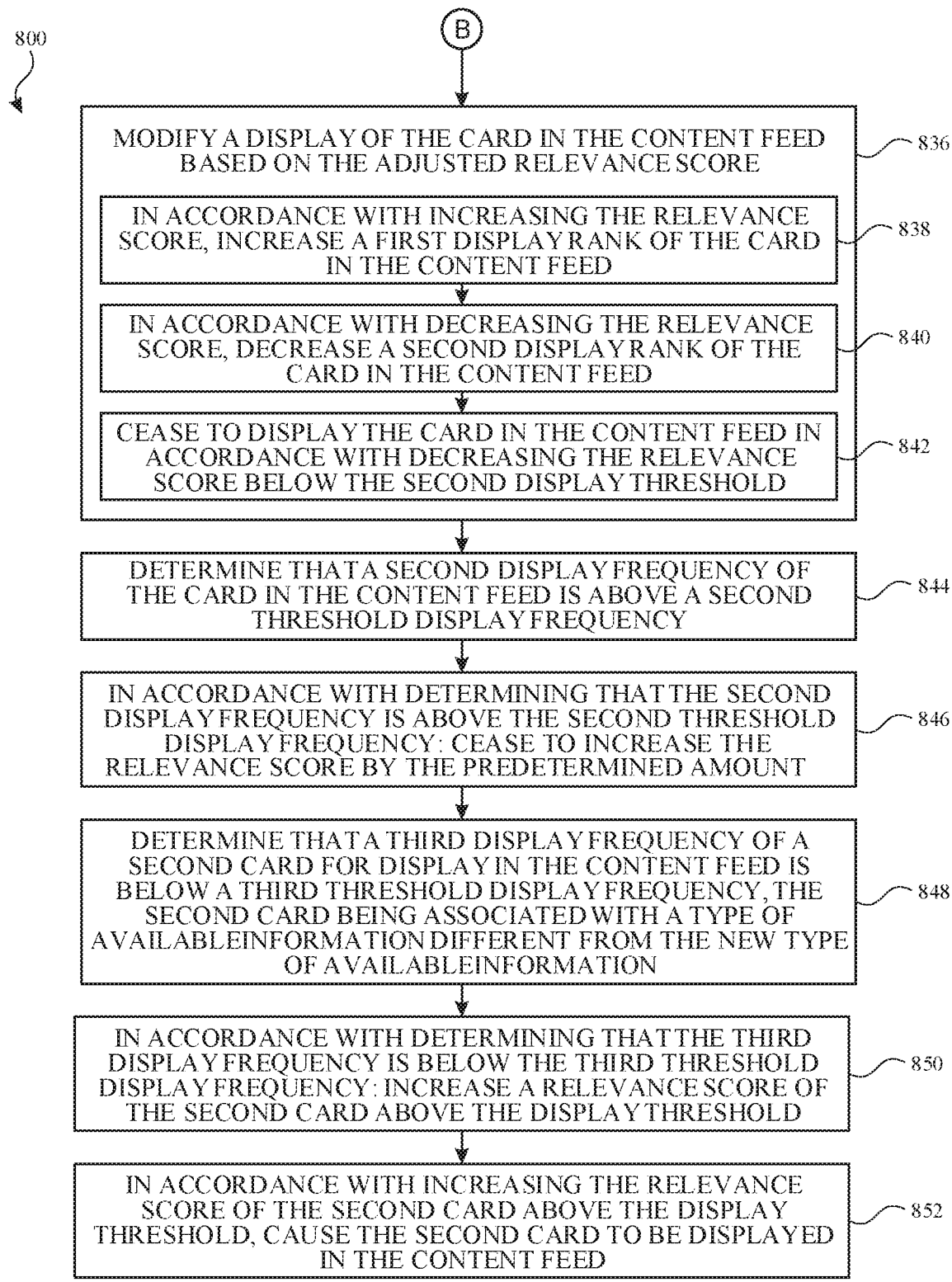

Below, FIGS. 1A-1B, 2, 3, 4A-4B, and 5A-B provide a description of exemplary devices for performing the techniques for determining the relevance of new available information. FIG. 6 illustrates an exemplary system for determining the relevance of new available information. FIGS. 7A-C illustrate various UIs used to determine the relevance of new available information. FIGS. 8A-C illustrate an exemplary process for determining the relevance of new available information.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
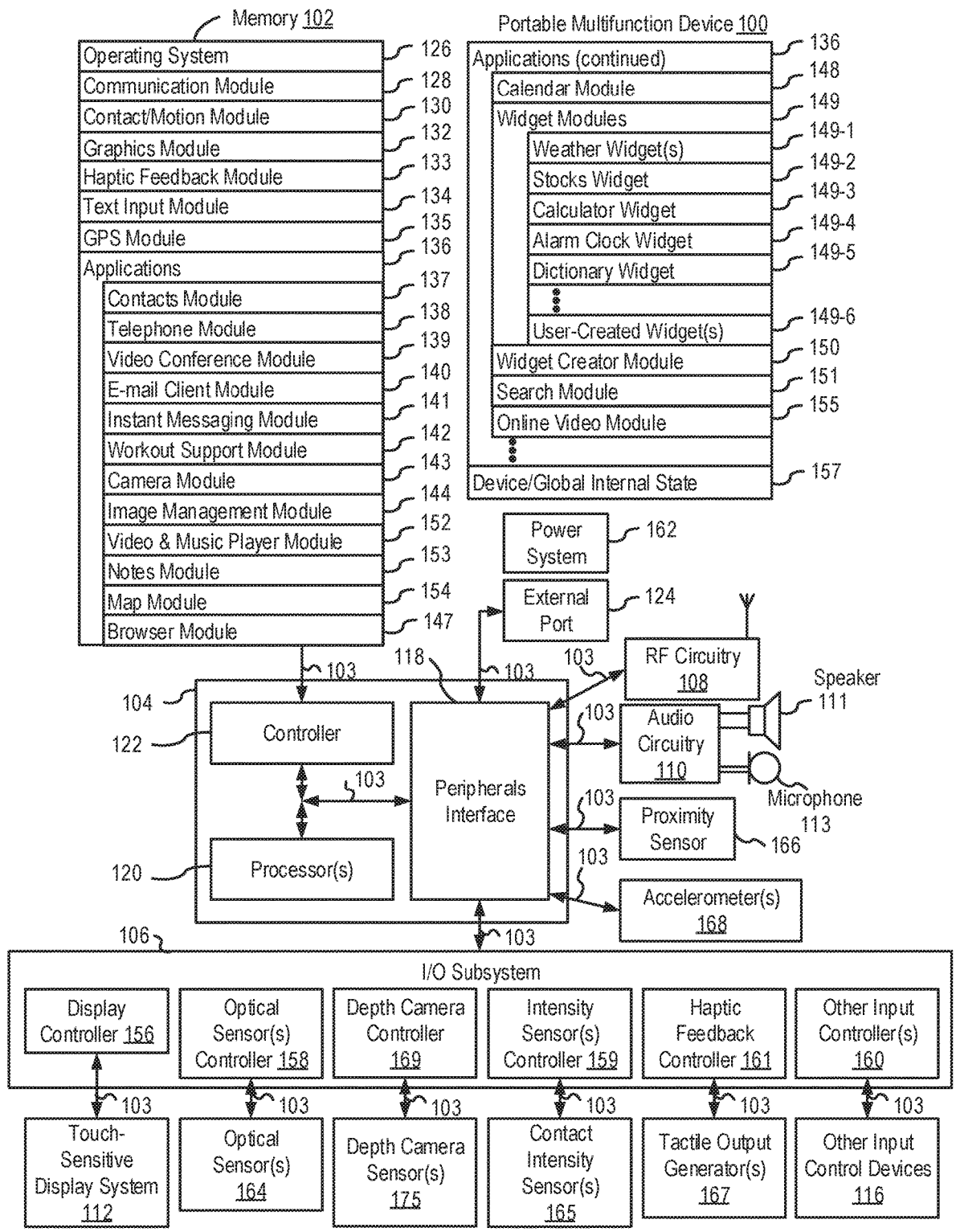
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG.

Figure 3:
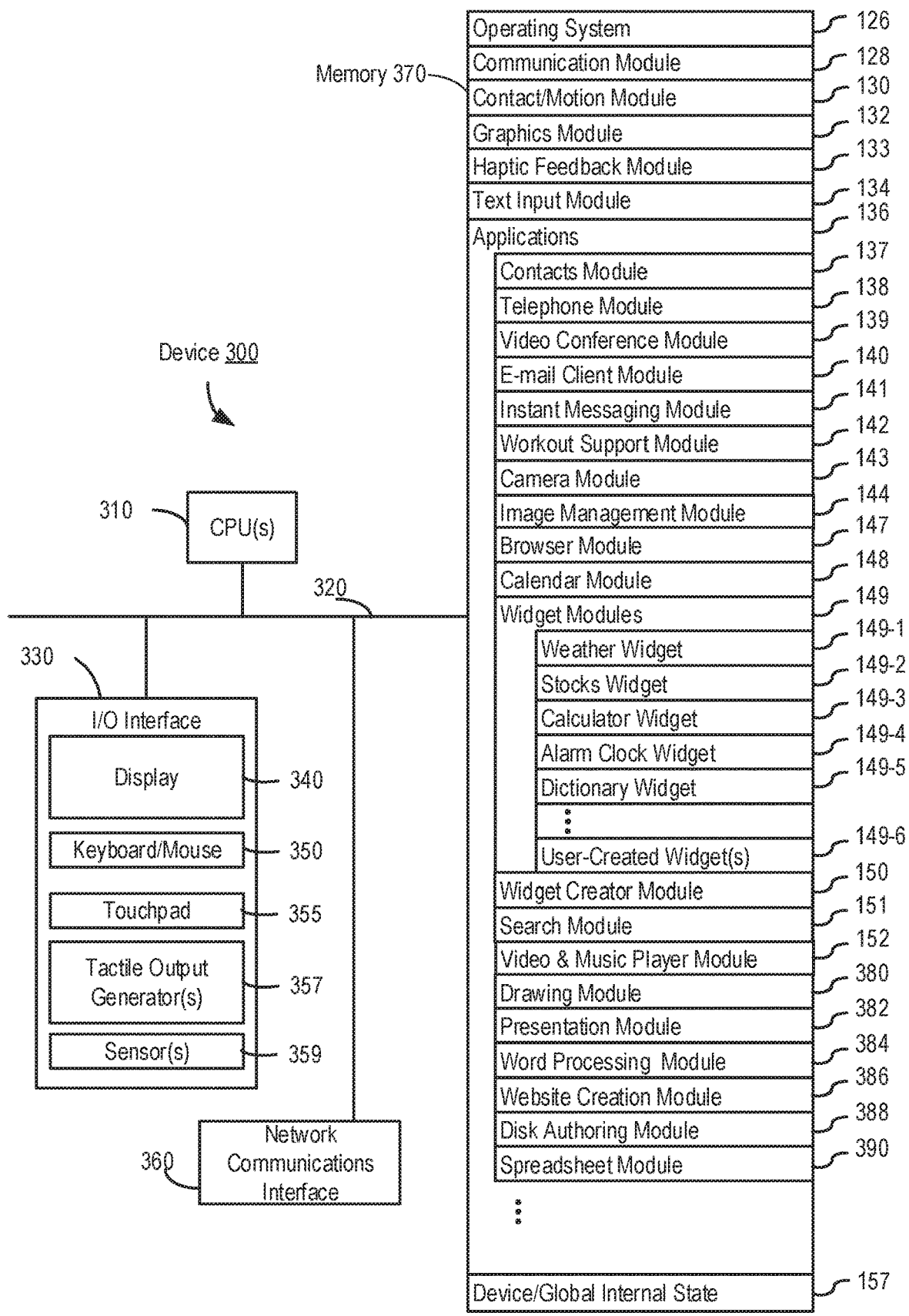
FIG. 3 is a block diagram of an exemplary multifunction device with a display and a touch-sensitive surface in accordance with some embodiments.

1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module, Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
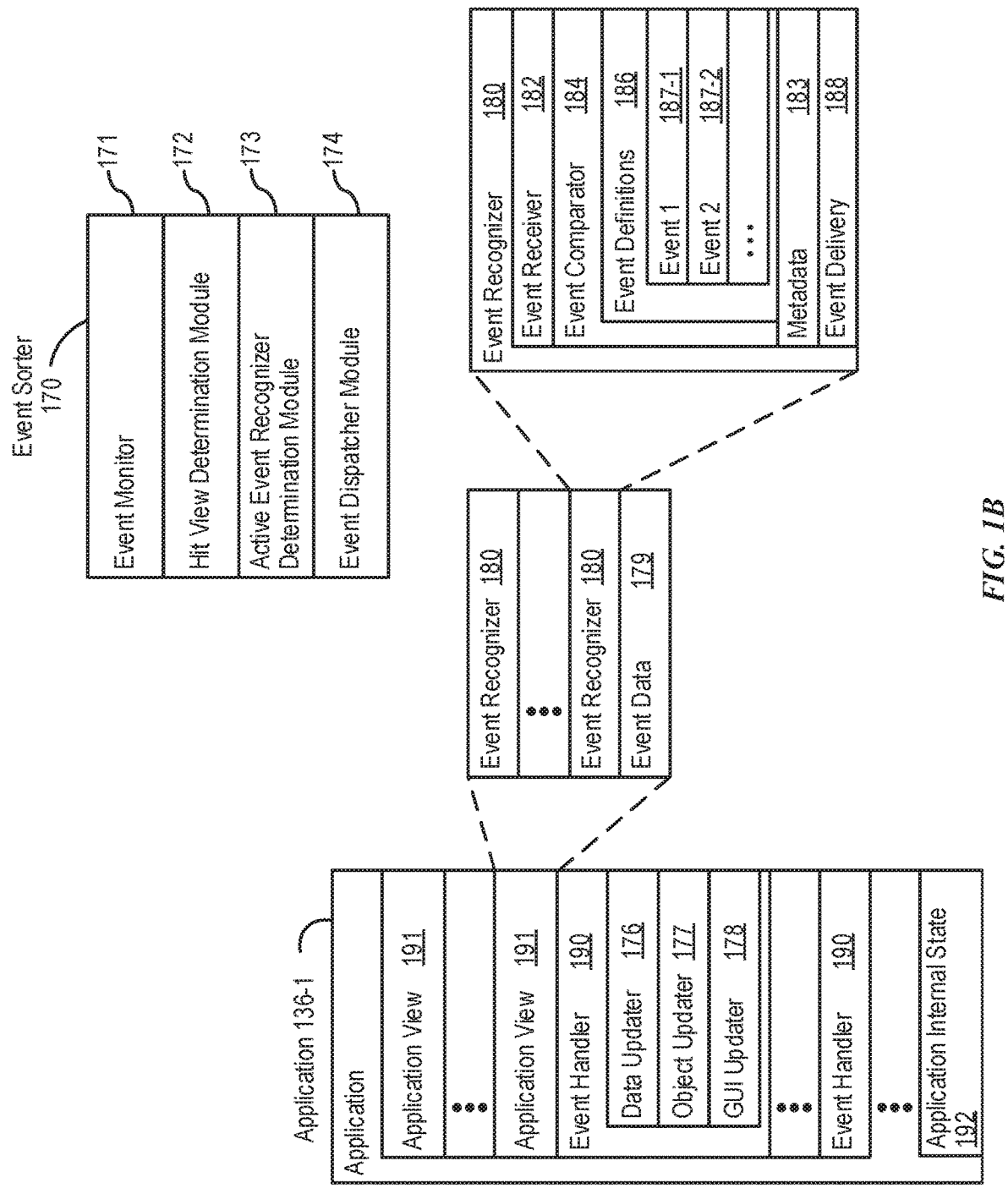
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
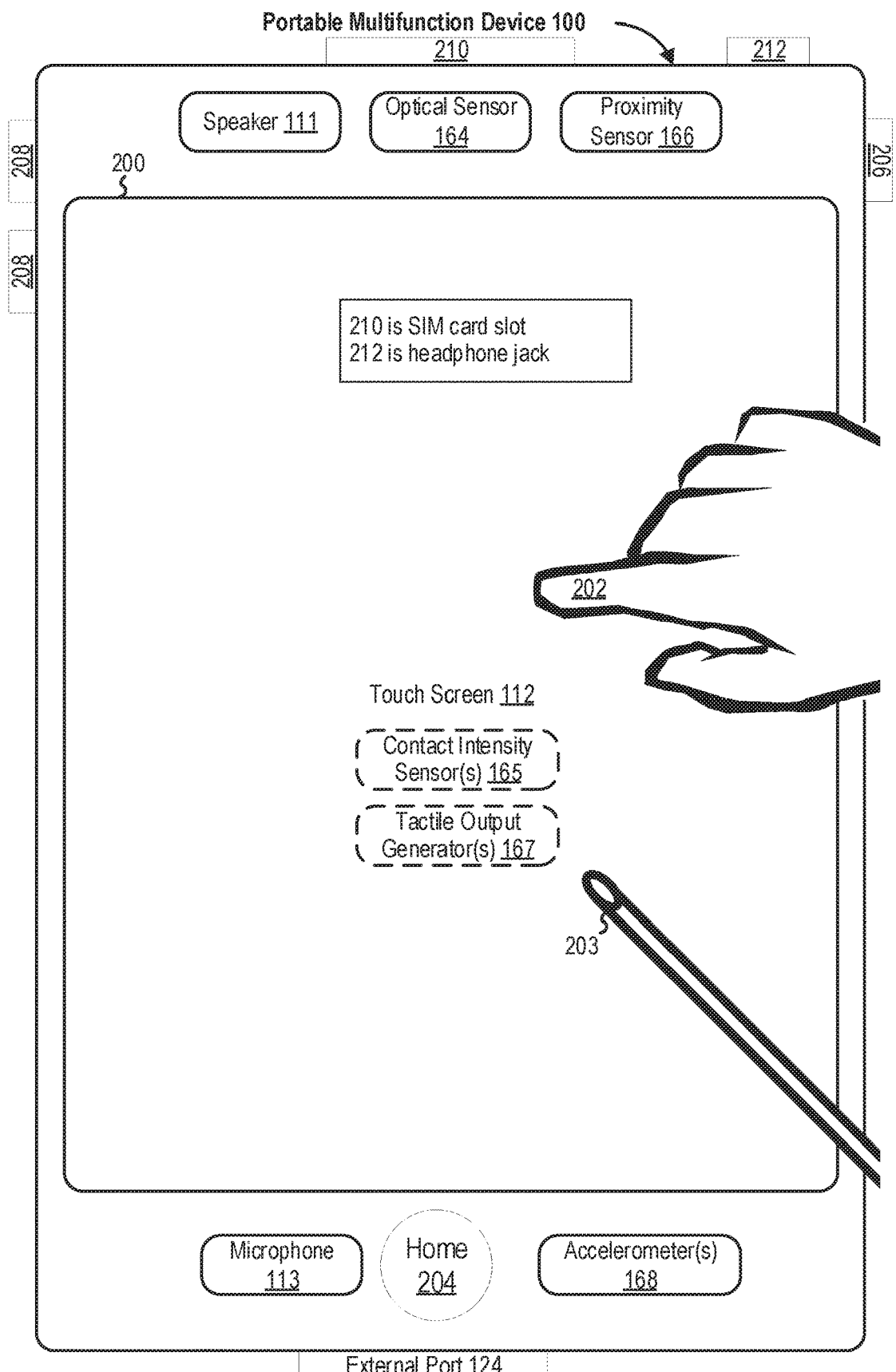
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
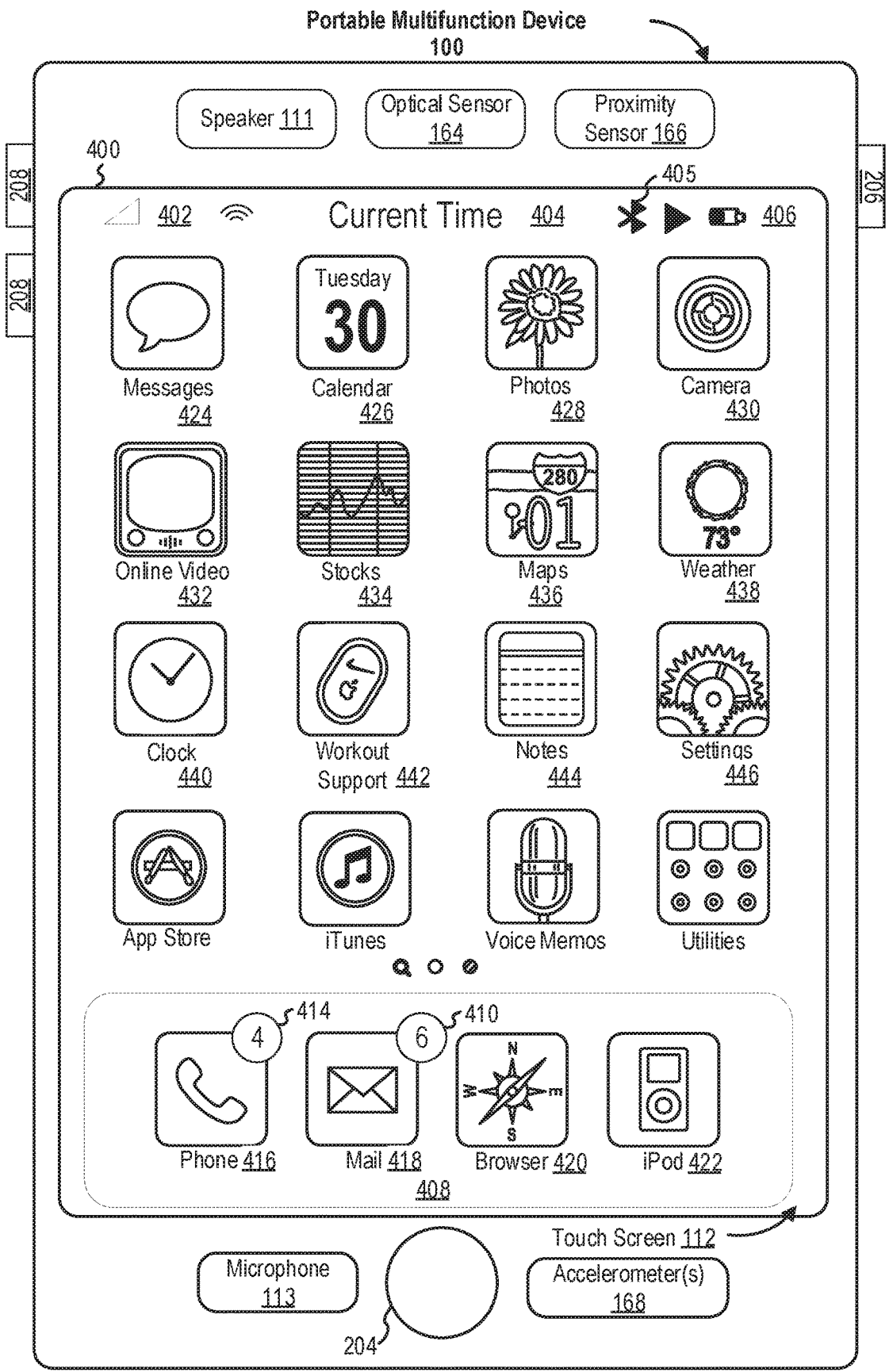
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
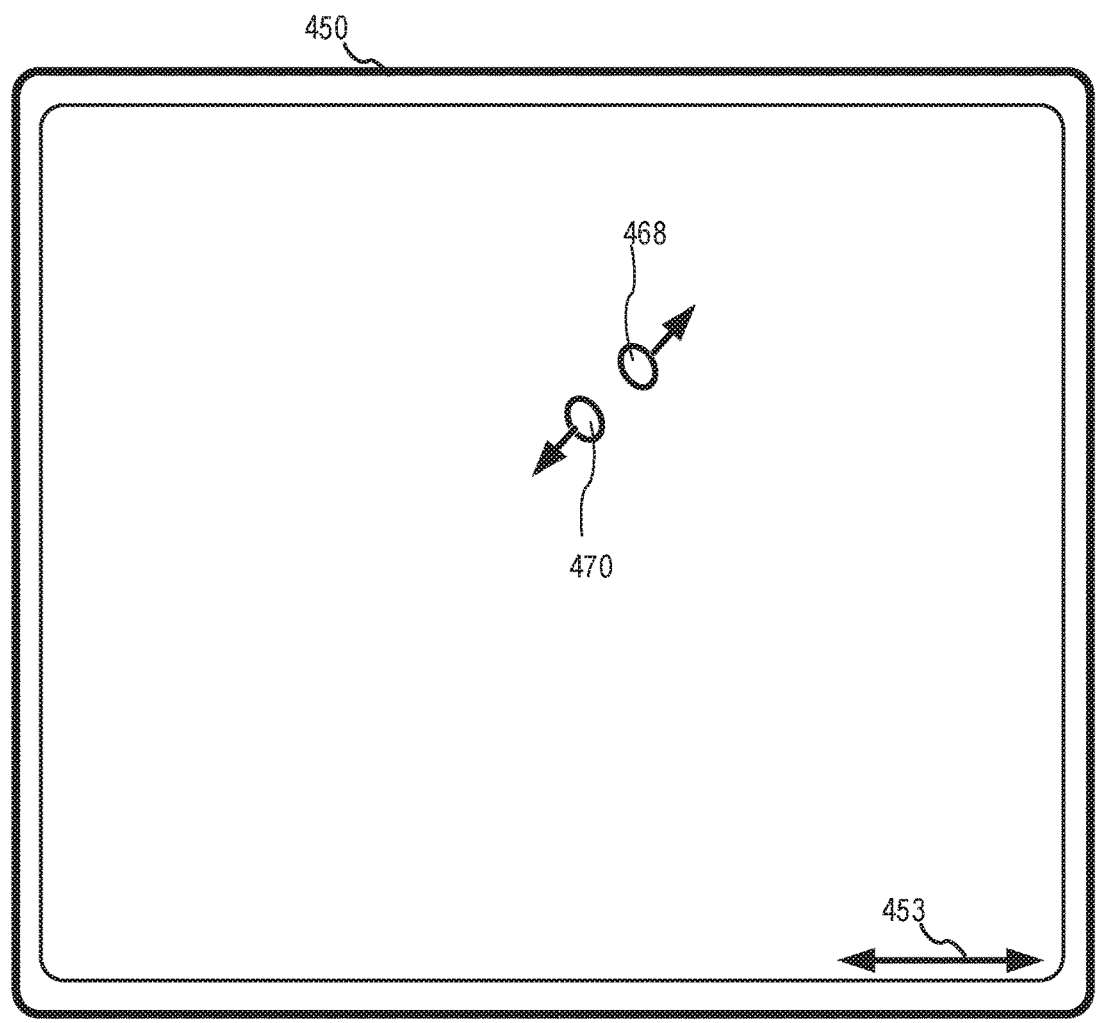
FIG. 4B illustrates an exemplary user interface for a multifunction device with a touch-sensitive surface that is separate from the display in accordance with some embodiments.
Figure 4B:
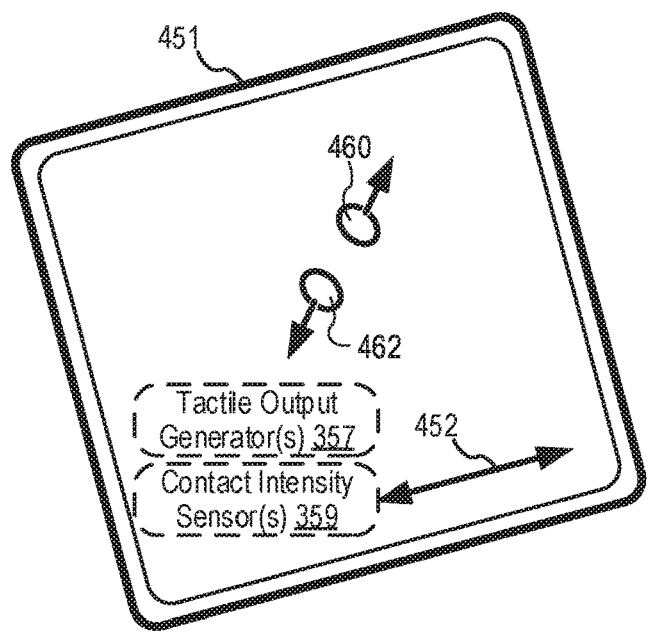

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
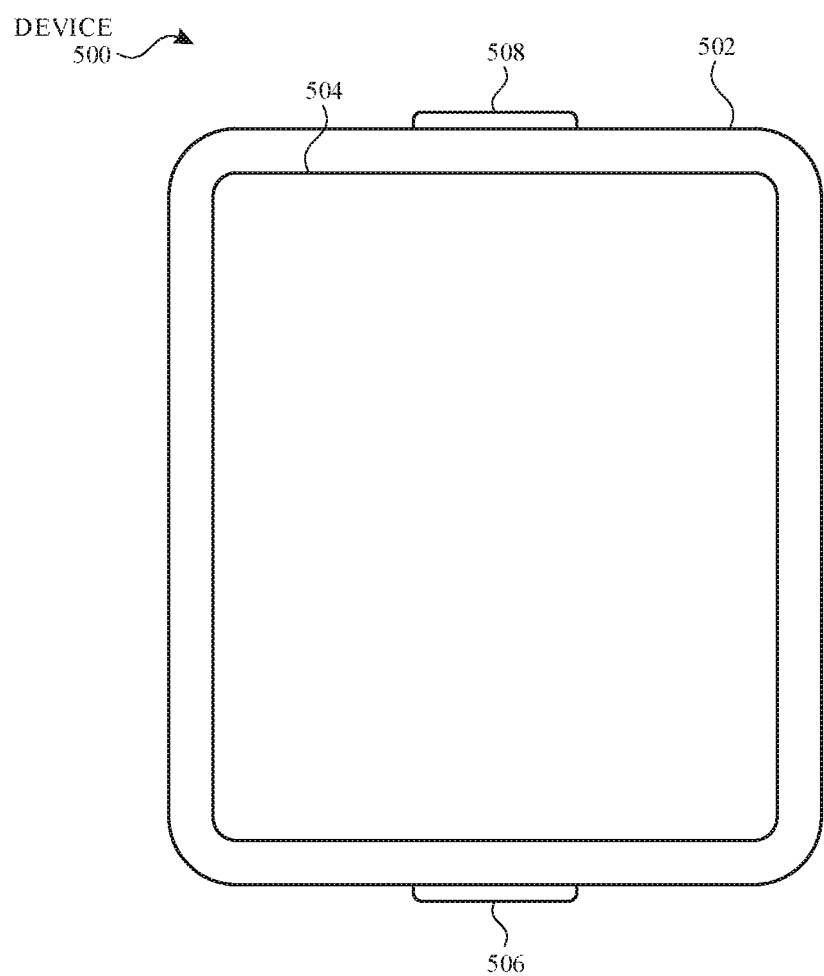
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
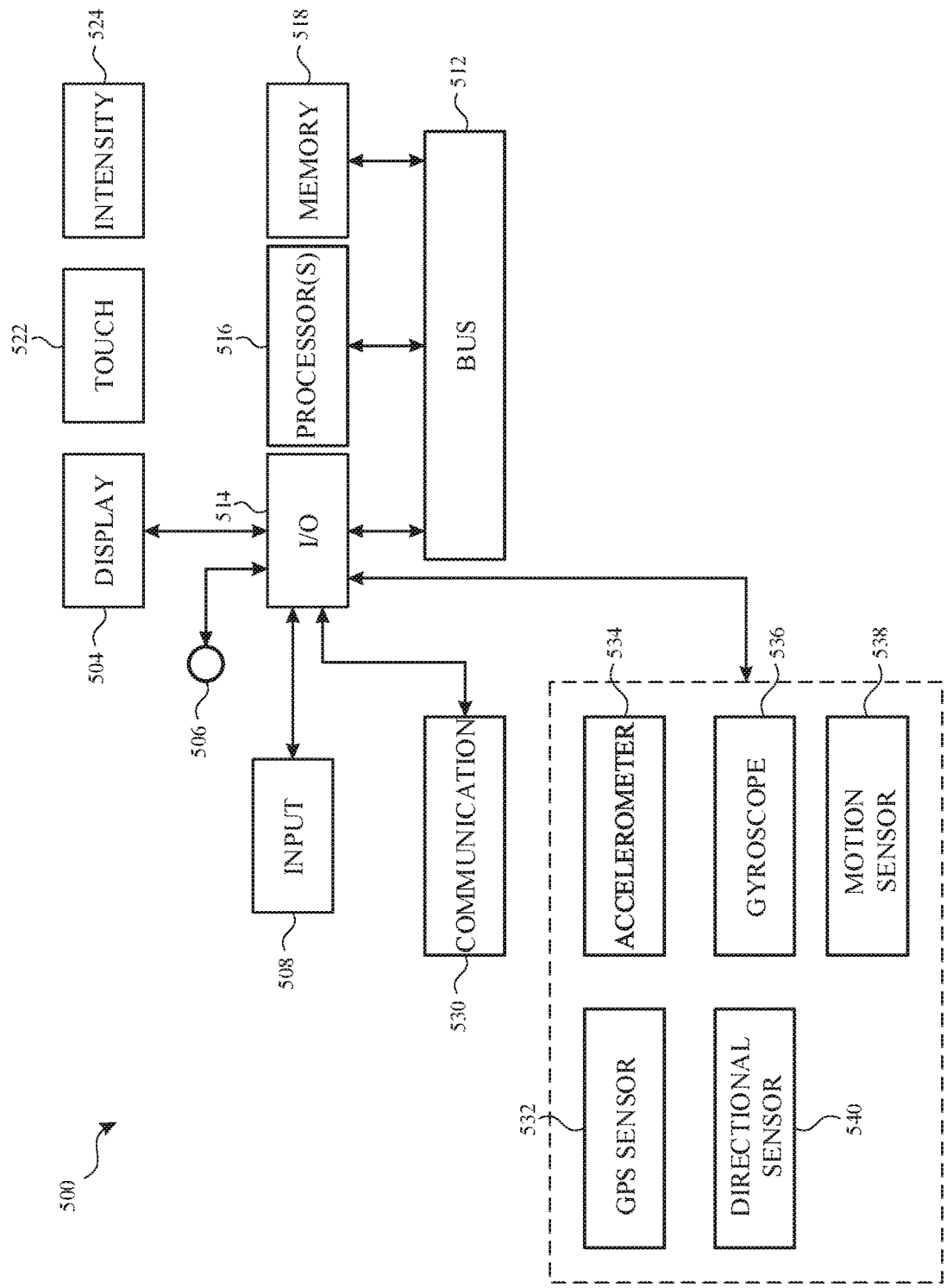
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 800 (FIGS. 8A-C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

FIG. 6 illustrates system 600 for determining the relevance of new available information, according to some embodiments. In some embodiments, system 600 is implemented on one or more electronic devices (e.g., 100, 300, 500, 700) and the modules and functions of system 600 may be distributed in any manner between the devices. In some embodiments, system 600 is implemented using a client-server system, where one or more electronic devices (e.g., 100, 300, 500, 700) are implemented as client devices communicatively coupled to a server system, e.g., through one or more networks. The modules and functions of system 600 may be distributed in any manner between the client device(s) and the server system.

System 600 is implemented using hardware, software, or a combination of hardware and software to carry out the principles discussed herein. Further, system 600 is exemplary, and thus system 600 can have more or fewer components than shown, can combine two or more components, or can have a different configuration or arrangement of the components. Further, although the below discussion describes functions being performed at a single component of system 600, it is to be understood that such functions can be performed at other components of system 600 and that such functions can be performed at more than one component of system 600.

To illustrate various embodiments herein, system 600 and FIGS. 7A-C are discussed together.

FIGS. 7A-C illustrate various user interfaces ("UI") displayed by device 700, according to some embodiments. Device 700 is, for example, the same as or similar to devices 100, 300, or 500, discussed above. In FIGS. 7A-C, device 700 is a smart phone. However, device 700 may be any type of device, such as a laptop computer, desktop computer, tablet, wearable device (e.g., smart watch), television, speaker, or any combination or sub-combination thereof.

System 600 includes available information module 610. Available information module 610 detects new available information, e.g., information not previously available to device 700. For example, available information module 610 detects new types of available information (e.g., heart rate data, sleep data, glucose data, weight data) different from the types of information available to system 600. For example, if system 600 is implemented using an electronic device capable of determining a user's activity data (e.g., distance traveled, flights of stairs climbed, steps taken), such types of data are available to system 600.

In some embodiments, an electronic device (e.g., external to the electronic device(s) implementing system 600) provides the new available information and module 610 detects such information. For example, a wearable device configured to detect a user's heart rate data provides detected heart rate data to module 610. As another example, a sleep tracking device configured to detect various sleep information (e.g., sleep cycles, sleep duration) provides detected sleep information to module 610. Other example external electronic devices that may provide new available information include a heart rate monitor, a glucose monitor, a scale, a medication tracking device, a treadmill and the like. In some embodiments, an information source external to the electronic device(s) implementing system 600 provides the new available information. For example, an information source including a user's electronic health record (EHR) provides the user's EHR to module 610.

In some embodiments, the new available information is based on information previously available to device 700. For example, the new available information is determined based on performing a new analysis on information available to module 610, such as a new analysis performed as a result of a software update. For example, if user activity data (e.g., distance traveled, flights of stairs climbed, steps taken) is available to module 610, performing a new analysis on such information can determine a metric indicating a user's overall activity during a particular time period.

In some embodiments, available information, including a new type of available information, is associated with a graphical element for display in a content feed. In some embodiments, a graphical element includes a card or a platter, as shown by cards 702, 704, 706, 708, and 710 in FIG. 7A, for instance. In some embodiments, a graphical element includes one or more visualizations (e.g., numbers, text, charts, graphs, affordances, icons, animations, and the like) determined based on the associated information. In some embodiments, a content feed includes separate graphical elements displayed adjacent to each other, e.g., in a list that a user may scroll through.

In some embodiments, a content feed is for an application installed on device 700. For example, FIG. 7A shows a content feed for a health related application installed on device 700. The content feed includes cards 704, 706, 708, and 710, respectively associated with walking and running distance, flights of stairs climbed, calories burned, and average heart rate. FIG. 7A further shows card 702. Card 702 is associated with new available information, such as sleep cycle information, and is not displayed in the content feed.

In some embodiments, a content feed is not associated with any specific application. For example, a content feed includes a general content feed, e.g., a suggestions feed or a notifications feed, including graphical elements associated with different applications. For example, a notifications feed of an electronic device may include a graphical element associated with a messaging application (e.g., notifying a user of a new message), a graphical element associated with a weather application (e.g., notifying the user of inclement weather), and a graphical element associated with a ride hailing application (e.g., notifying a user of the arrival of a car). In other embodiments, a content feed includes a web feed or a news feed associated with a website.

In some embodiments, available information module 610 determines a display frequency of a graphical element in a content feed. A display frequency indicates a frequency with which a graphical element is displayed. As used herein, a graphical element is displayed when an electronic device uses one or more pixels of a display to display the graphical element (or a portion thereof). For example, a graphical element in a content feed is displayed (displayed once) if a user provides input to display the content feed, such as input to display a user interface associated with an application or input to access a website.

In some embodiments, a display frequency includes a numerical value (e.g., 1, 2, 3) indicating the number of times a graphical element is displayed in a content feed. In some embodiments, a display frequency includes a percentile rank of the number of times a graphical element is displayed relative to the number of times other graphical elements are displayed (e.g., bottom 0.5%, bottom 1%, bottom 5%, top 0.5%, top 1%, top 5%).

In some embodiments, available information module 610 detects new available information by determining that a display frequency of a graphical element associated with the new available information (new graphical element) is below a threshold display frequency. In some embodiments, the threshold display frequency includes a numerical value (e.g., 1, 2, 3). In some embodiments, the threshold display frequency includes a percentile (e.g., bottom 0.5%). In some embodiments, a "new graphical element" has a display frequency below the threshold display frequency, while an "old graphical element" has a display frequency above the threshold display frequency. In FIG. 7A, available information module 610 detects new available sleep information by determining that the display frequency of card 702 is below a threshold display frequency.

System 600 includes relevance module 620. Relevance module 620 determines respective relevance scores of graphical elements for display in a content feed. A relevance score of a graphical element indicates a degree of current relevance of the graphical element to a user. For example, a high (e.g., above a threshold) relevance score indicates that a corresponding graphical element is likely relevant to a user, while a low (e.g., below a threshold) relevance score indicates that a corresponding graphical element is unlikely relevant to the user.

In some embodiments, relevance module 620 uses relevance model 630 (e.g., a machine-learned model) to determine respective relevance scores of graphical elements. For example, relevance model 630 collects and/or determines various data and uses such data to determine relevance scores. In some embodiments, relevance module 620 trains relevance model 630 using such data over time so the relevance model is configured to dynamically adjust (update) determined relevance scores. In some embodiments, the data represents user interactions with a graphical element that indicate user interest or disinterest in the graphical element (e.g., dismissal of the graphical element, tap gestures associated with the graphical element, user gaze directed to the graphical element). In this manner, relevance model 630 can determine and/or adjust a relevance score of a graphical element based on whether the user was previously interested or disinterested in the graphical element. Further optional information used to determine a relevance score includes various context information such as a current time, a user location, an open application, a current activity a user is engaged in (e.g., in a meeting or in a workout session), a rate of travel of a user, the source of the information associated with the graphical element, the content of the graphical element, the frequency with which the graphical element is displayed, the time since the last display of the graphical element, or a combination or sub-combination thereof. Further details regarding determining relevance scores of graphical elements are described in U.S. patent application Ser. No. 15/721,717, the content of which is hereby incorporated by reference in its entirety.

In some embodiments, a position of a graphical element in a content feed is based on the relevance score of the graphical element. For example, graphical elements in a content feed are ordered based on decreasing relevance. For example, the most relevant graphical element (e.g., having the highest relevance score) is displayed at the top of the content feed, while less relevant graphical elements are displayed below the most relevant graphical element. As another example, when graphical elements are displayed in a virtual z-space, e.g., in augmented or virtual reality applications, the most relevant graphical element is displayed at the front of the content feed, while less relevant graphical elements are displayed behind the most relevant graphical element. As another example, graphical elements are displayed in a virtual z-space when graphical elements are displayed using three-dimensional computer graphics, e.g., in a stack that a user may scroll through to cause different graphical elements to be displayed at the top of the stack. In such examples, the most relevant graphical element is displayed at the top/front of the stack (so it appears closest to a user), while less relevant graphical elements are displayed behind the most relevant graphical element (so they appear further from the user). Thus, in some embodiments, a relevance score of a graphical element represents a display rank of the graphical element. For example, the graphical element having the highest relevance score has the highest display rank (e.g., first, at the top of the feed), the graphical element having the second highest relevance score has the second highest display rank (e.g., second, below the graphical element having the highest display rank), and so on.

For example, in FIG. 7A, relevance model 630 determines respective relevance scores of cards 702, 704, 706, 708, and 710. The relevance score of card 704 is greater than the relevance score of card 706, which is greater than the relevance score of card 708, and so on, with the relevance score of new card 702 being the lowest. The relevance scores of cards 704, 706, 708, and 710 are relatively high because relevance model 630 has determined from previous user interactions with the cards that a user is interested in the cards. In contrast, because card 702 is new, relevance model 630 has limited or no data regarding previous user interaction with the card. Thus, the relevance score of new card 702 is low, and the new card is not displayed in the content feed.

It should be appreciated that due to screen size limitations, text size limitations, and the like, in some embodiments, not all graphical elements available for display in a content feed are displayed in the content feed. For example, only a predetermined number of graphical elements having the highest relevance scores are initially displayed in a content feed. Further, the manner of display (e.g., display location, display size) of graphical elements in a content feed may vary based on screen size limitations, text size limitations, and/or the type of electronic device displaying the content feed. For example, in FIG. 7A, four cards are displayed in the content feed, but other cards (e.g., 702) are not displayed in the content feed (though they may be available for display, e.g., if the user scrolls through the content feed).

In some embodiments, relevance module 620 increases a relevance score of a graphical element (e.g., card 702) above a display threshold. In some embodiments, relevance module 620 increases a relevance score of a graphical element above a display threshold in accordance with available information module 610 detecting new available information associated with the graphical element, as discussed above. A graphical element having a relevance score above a display threshold is displayed in a content feed. Accordingly, in some embodiments, to ensure that a graphical element is displayed in a content feed, the display threshold is based on the relevance scores of other graphical elements. For example, the display threshold is the relevance score of the graphical element displayed at the bottom of the content feed (e.g., card 710 in FIG. 7A). As another example, the display threshold is the relevance score of the graphical element displayed at the top of the content feed (e.g., card 704 having the highest relevance score). Thus, in some embodiments, by increasing a relevance score of a new graphical element above the threshold, the new graphical element (e.g., card 702) will be displayed at the top of the content feed. In this manner, relevance module 620 can be biased towards determining that graphical elements associated with new available information are more relevant.

In some embodiments, all determined relevance scores fall within a predetermined range, e.g., 0 to 1. In some embodiments, increasing a relevance score above a display threshold includes increasing the relevance score by a predetermined amount, such as an amount equal to the upper limit of the range (e.g., 1). Thus, in some embodiments, increasing a relevance score of a graphical element above a display threshold includes increasing the relevance score above all other relevance scores of all other graphical elements for display in a content feed. In this manner, relevance module 620 may increase the relevance score of a new graphical element above the relevance score of all old graphical elements. Thus, the new graphical element may be displayed in a content feed, informing a user of the new available information and allowing determination of user interest or disinterest in the new available information.

In some embodiments, increasing a relevance score, e.g., above a display threshold, is based on a display frequency of a graphical element. For example, the amount by which a relevance score of a graphical element is increased is a function of the display frequency of the graphical element. For example, more frequently displayed graphical elements have their respective relevance scores increased by a lesser amount, while less frequently displayed graphical elements have their respective relevance scores increased by a greater amount. In some embodiments, the amount by which a relevance score of a graphical element is increased is based on other information available to system 600, such as the display frequency of other graphical elements and context information (as discussed above).

As discussed further below, in some embodiments, after increasing a relevance score above the display threshold, the relevance score is maintained above the display threshold (e.g., has a value of 1) until a display frequency of the graphical element is above a threshold display frequency. In some embodiments, after the display frequency of the graphical element is above the threshold display frequency, relevance module 620 no longer increases the relevance score above the display threshold (e.g., every time relevance module 620 determines and/or updates the relevance score) and instead relevance module 620 adjusts the relevance score based on user interaction with the graphical element, as discussed below.

System 600 includes display module 640. Display module 640 causes display of graphical elements in a content feed. In some embodiments, display module 640 causes display of graphical elements in a content feed in a position/order based on the respective relevance scores of the graphical elements, as discussed above. For example, in FIG. 7B, the relevance score of card 702 (previously low) is increased above the display threshold. Thus, card 702 is now displayed at the top of the content feed.

System 600 includes user interaction module 650. User interaction module 650 obtains data representing user interaction with displayed graphical elements (e.g., card 702). In some embodiments, user interaction module 650 provides the data to relevance module 620 and module 620 trains relevance model 630 to determine and/or adjust relevance scores of graphical elements based on the data. In some embodiments, user interaction module 650 determines whether the data includes a signal representing user interest in a displayed graphical element or a signal representing user disinterest in the graphical element.

Example signals representing user interest in a displayed graphical element indicate:
  user-performed gestures associated with the graphical element, such as a user tap gesture associated with the graphical element (e.g., a tap gesture performed on a portion of a display displaying the graphical element) or a user selection (e.g., via a tap gesture, swipe gesture, etc.) of the graphical element to cause a more detailed view of the associated information to be displayed;
  that the graphical element has been displayed for at least a predetermined duration (e.g., 0.5, 1, 1.5, 2, 3, 4, or 5 seconds) (e.g., without a user scrolling past the graphical element to cease its display);
  that a user selects (e.g., taps, or otherwise selects) the graphical element to cause a more detailed view of the associated information to be displayed;
  that the detailed view of the associated information is displayed for longer than a predetermined duration (e.g., 1, 2, 3, 4, or 5 seconds);
  that a user's gaze is directed to the graphical element for longer than a predetermined duration (e.g., 0.5, 1, 1.5, 2, 3, 4, or 5 seconds). For example, device 700 obtains user eye gaze data using sensor(s) 164 and/or 175 and determines a duration for which the user's gaze is directed to the graphical element;
  a user issued voice command associated with the graphical element (e.g., a user saying "show me more of my sleep cycle information" to device 700); and
  user settings indicating user interest in the graphical element (e.g., a user favorite graphical element, a user "like" of a graphical element).

Example signals representing user disinterest in a displayed graphical element indicate:
  that a user causes the display of the graphical element to cease. For example, a user scrolls past the graphical element within a predetermined duration of the graphical element being displayed or a user provides input dismissing the graphical element (e.g., a swipe or selection of an affordance displayed near the graphical element or overlapping the graphical element);
  that a user does not select the graphical element within a predetermined duration of the graphical element being displayed (e.g., 1.5 seconds);
  that the graphical element is displayed for less than a predetermined duration (e.g., 1.5 seconds);
  that a user's gaze is directed to the graphical element for shorter than a predetermined duration (e.g., 1.5 seconds); and
  user settings indicating disinterest in the graphical element (e.g., a user setting blocking the graphical element from display, a user "dislike" of a graphical element).

In some embodiments, based on the obtained data representing user interaction with a displayed graphical element, relevance module 620 adjusts a relevance score of the graphical element. For example, relevance module 620 increases the relevance score in accordance with user interaction module 650 obtaining a signal representing user interest in the displayed graphical element. As another example, relevance module 620 decreases the relevance score in accordance with user interaction module 650 obtaining a signal representing user disinterest in the displayed graphical element. In some embodiments, adjusting a relevance score of a graphical element includes decreasing the relevance score below a second display threshold. A graphical element having a relevance score below a second display threshold is not displayed. For example, the second display threshold is the relevance score of the last (e.g., closest to the bottom) graphical element that would be displayed in the content feed.

In some embodiments, adjusting a relevance score of the graphical element includes training relevance model 630 based on obtained data representing user interaction with a displayed graphical element. For example, based on a signal representing user interest in a displayed graphical element, relevance model 630 is trained to determine a higher relevance score of the graphical element. As another example, based on a signal representing user disinterest in a displayed graphical element, relevance model 630 is trained to determine a lower relevance score of the graphical element. In some embodiments, user interaction module 650 obtains signals representing user interest or disinterest in a displayed graphical element over time and relevance model 630 is trained based on the signals. For example, relevance model 630 determines a first frequency of obtaining signals representing user interest in a graphical element and a second frequency of obtaining signals representing user disinterest in the graphical element. In some embodiments, relevance model 630 is trained to determine and/or adjust a relevance score based on the first and second frequencies. For example, if a user is interested in a card most times it is displayed (e.g., performs a tap gesture associated with the card), relevance model 630 is trained to increase the relevance score of the card. However, if a user is not interested in a card most times it is displayed (e.g., scrolls past the card), relevance model 630 is trained to decrease the relevance score of the card, for instance.

Thus, according to the techniques discussed herein, new graphical elements may be displayed when they otherwise would not be displayed, e.g., due to having a low relevance score. Upon displaying the new graphical element, a model can be trained using obtained user interaction data to determine and adjust the new graphical element's relevance.

In some embodiments, display module 640 modifies a display of a graphical element in a content feed based on an adjusted relevance score of the graphical element. In some embodiments, modifying a display of a graphical element includes changing a position of the graphical element in the content feed (e.g., increasing or decreasing its display rank) or ceasing to display the graphical element (or a portion thereof) in the content feed. In some embodiments, modifying a display of a graphical element includes changing the content (e.g., text size, text font, color, style) or orientation of the graphical element, or otherwise modifying a display of a graphical element compared to when it was previously displayed.

For example, in accordance with relevance module 620 increasing a relevance score of a graphical element, display module 640 increases a display rank of the graphical element in the content feed. For example, the graphical element is moved closer to the top of the content feed, e.g., compared to when the graphical element was previously displayed. As another example, in accordance with relevance module 620 decreasing the relevance score of a graphical element, display module 640 decreases a display rank of the graphical element in the content feed. For example, the graphical element is moved further from the top of the content feed, e.g., compared to when the graphical element was previously displayed. As another example, in accordance with relevance module 620 decreasing the relevance score of a graphical element below the second display threshold, display module 640 ceases to display the graphical element in a content feed.

In some embodiments, available information module 610 determines that a display frequency of a graphical element is above a threshold display frequency. In some embodiments, the threshold display frequency is the same as the threshold display frequency discussed above (e.g., used to determine whether a graphical element is new). In some embodiments, in accordance with available information module 610 determining that a display frequency of a graphical element is above a threshold display frequency, relevance module 620 ceases to increase the relevance score of the graphical element by a predetermined amount. In some embodiments, in accordance with available information module 610 determining that a display frequency of a graphical element is above a threshold display frequency, relevance module 620 decreases the relevance score of the graphical element by a predetermined amount, e.g., subtracts the predetermined amount from the relevance score. In some embodiments, the predetermined amount is the same as the amount by which the relevance score of the graphical element was increased, e.g., increased in accordance with detecting new available information associated with the graphical element.

For example, in FIG. 7B, the relevance score of new card 702 is increased, e.g., by a value of 1, in accordance with detecting new available sleep information. New card 702 is thus displayed in the health application content feed. For example, new card 702 is displayed every time a user provides input to display the content feed. User interaction module 650 then obtains data representing user interest and/or disinterest in the displayed new card and relevance model 630 is trained based on such data, as discussed above.

After the display frequency of the new card is above a threshold display frequency (e.g., the content feed has been displayed enough times), relevance module 620 ceases to increase the relevance score of the new card (e.g., by a value of 1) and instead determines and/or adjusts the relevance score based on previous user interaction with the card, as discussed above. The duration between when the relevance score of new card 702 is increased and not increased can thus represent a training period during which relevance model 630 is trained to determine the relevance of the new card. After the training period expires, relevance model 630 may be trained to determine an appropriate relevance score for the new card, and thus the increase in the relevance score may no longer be necessary.

For example, in FIG. 7C, the relevance score of card 702 is no longer increased (e.g., by 1). However, based on the obtained data, relevance model 630 determines that a user is likely interested in the card. For example, relevance model 630 determines that most of the time card 702 is displayed, the user selects the card to display a detailed view of the user's sleep cycle information. Relevance model 630 thus determines a relatively high relevance score of the card (adjusted relevance score). For example, the relevance score of card 702 is higher than the respective relevance scores of cards 706 and 708, but lower than the relevance score of card 704. As shown in FIG. 7C, the display of card 702 is thus modified (from FIG. 7B) based on the adjusted relevance score.

Although some discussed embodiments concern increasing the relevance scores of graphical elements associated with new available information to determine the relevance of such information, in some embodiments, similar techniques are applied to update the relevance of previously available information. For example, as discussed above, a graphical element having a display frequency below a threshold display frequency may be considered a "new graphical element," even if the information associated with the graphical element was previously available. Thus, if the display frequency of a graphical element falls below a threshold, the graphical element is displayed and data representing user interaction with the graphical element is obtained, according to the techniques discussed above. In some embodiments, a model is trained based on the obtained data to update the relevance score of the graphical element, according to the techniques discussed above.

For example, suppose system 600 can access previously available information about a user's nutrition, such as caffeine intake. However, a card associated with such information is seldom or never displayed (e.g., is in the bottom 0.5% of displayed cards). Upon detecting that the card is in the bottom 0.5% of displayed cards, the card is caused to be displayed at the top of a content feed and data representing user interest or disinterest in the card is obtained. Based on the data, the relevance score of the card is updated. In this manner, if a user forgot that a device could provide nutrition information, but is interested in such information, the user may be reminded of such information. Based on user interaction with the card displaying the nutrition information, system 600 can determine user interest in such information and continue to display the card, e.g., every time a health application content feed is displayed. In this manner, the relevance scores of seldom or never displayed graphical elements may be advantageously updated (e.g., when they otherwise would not be updated because they would not be displayed).

FIGS. 8A-C illustrate a flow diagram of process 800 for determining the relevance of new available information, according to some embodiments. In some embodiments, process 800 is performed at one or more electronic devices (e.g., 100, 300, 500, 700) each having one or more processors and memory. In some embodiments, process 800 is performed using a client-server system, with the operations of process 800 divided up in any manner between the client device(s) (e.g., 100, 300, 500, 700) and the server. Some operations in process 800 are, optionally, combined, the orders of some operations are, optionally, changed, and some operations are, optionally, omitted.

At block 802, a new type of available information is detected (e.g., by module 610), the new type of available information being associated with a card for display in a content feed. In some embodiments, detecting the new type of available information includes determining that a display frequency of the card in the content feed is below a threshold display frequency, as shown in block 804. In some embodiments, the new type of available information includes health information. In some embodiments, the content feed is associated with a health related application installed on the electronic device. In some embodiments, the new type of available information is provided by an external electronic device configured to detect the new type of available information.

At block 806, in some embodiments, in accordance with detecting the new type of available information, a relevance score of the card is determined using a relevance model (e.g., model 630). In some embodiments, the relevance score is less than a display threshold. In some embodiments, the card is included in a plurality of cards for display in the content feed, the plurality of cards each having respective relevance scores.

At block 808, in accordance with detecting the new type of available information, a relevance score of the card is increased above a display threshold (e.g., by module 620). In some embodiments, increasing the relevance score of the card above the display threshold includes increasing the relevance score by a predetermined amount, as shown in block 810. In some embodiments, increasing the relevance score of the card above the display threshold includes increasing the relevance score above every other relevance score of the respective relevance scores, as shown in block 812.

At block 814, in accordance with increasing the relevance score above the display threshold, the card is caused to be displayed in the content feed (e.g., by module 640). In some embodiments, causing the card to be displayed in the content feed includes causing the card to be displayed at the top of the content feed, as shown in block 816. In some embodiments, causing the card to be displayed in the content feed includes causing the card to be displayed at a position in the content feed based on the relevance score, as shown in block 818.

At block 820, data representing user interaction with the displayed card is obtained (e.g., by module 650). In some embodiments, obtaining the data representing user interaction with the displayed card includes obtaining a signal representing user interest in the displayed card, as shown in block 822. In some embodiments, the signal representing user interest in the displayed card indicates a user-performed gesture associated with the displayed card. In some embodiments, obtaining the data representing user interaction with the displayed card includes obtaining a signal representing user disinterest in the displayed card, as shown in block 824. In some embodiments, the signal representing user disinterest in the displayed card indicates that a user scrolled past the card in the content feed within a predetermined duration of displaying the card in the content feed.

At block 826, the relevance score is adjusted based on the data representing user interaction with the displayed card (e.g., by module 620). In some embodiments, adjusting the relevance score includes increasing the relevance score in accordance with obtaining the signal representing user interest in the displayed card, as shown in block 828. In some embodiments, adjusting the relevance score includes decreasing the relevance score in accordance with obtaining the signal representing user disinterest in the displayed card, as shown in block 830. In some embodiments, adjusting the relevance score includes decreasing the relevance score below a second display threshold, as shown in block 832. In some embodiments, adjusting the relevance score includes training the relevance model (e.g., model 630) based on the data representing user interaction with the displayed card, as shown in block 834.

At block 836, a display of the card in the content feed is modified based on the adjusted relevance score (e.g., by module 640). In some embodiments, modifying the display of the card in the content feed includes: in accordance with increasing the relevance score, increasing a first display rank of the card in the content feed, as shown in block 838. In some embodiments, modifying the display of the card in the content feed includes: in accordance with decreasing the relevance score, decreasing a second display rank of the card in the content feed, as shown in block 840. In some embodiments, modifying the display of the card in the content feed includes ceasing to display the card in the content feed in accordance with decreasing the relevance score below the second display threshold, as shown in block 842.

At block 844, in some embodiments, it is determined that a second display frequency of the card in the content feed is above a second threshold display frequency (e.g., by module 610).

At block 846, in some embodiments, in accordance with determining that the second display frequency is above the second threshold display frequency, increasing the relevance score by the predetermined amount is ceased (e.g., by module 620).

At block 848, in some embodiments, is it determined that a third display frequency of a second card for display in the content feed is below a third threshold display frequency (e.g., by module 610). In some embodiments, the second card is associated with a type of available information different from the new type of available information.

At block 850, in some embodiments, in accordance with determining that the third display frequency is below the third threshold display frequency, a relevance score of the second card is increased above the display threshold (e.g., by module 620).

At block 852, in some embodiments, in accordance with increasing the relevance score of the second card above the display threshold, the second card is caused to be displayed in the content feed (e.g., by module 640).

The operations described above with reference to FIGS. 8A-C are optionally implemented by components depicted in FIGS. 1-6. For example, the operations may be implemented by system 600. It would be clear to a person having ordinary skill in the art how other processes are implemented based on the components depicted in FIGS. 1-6.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the relevance of displayed graphical elements. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display more relevant content to a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting data representing user interactions with graphical elements, the present technology can be configured to allow users to select to "opt in" or "opt out" of participation in the collection of personal information data during registration for services or anytime thereafter. In another example, users can select not to provide data representing user interactions with graphical elements to train a model to determine relevance scores. In yet another example, users can select to limit the length of time data representing user interactions with graphical elements are maintained or entirely prohibit the collection of such data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, graphical elements can be displayed based on non-personal information data or a bare minimum amount of personal information, such as the content being requested by the device associated with a user, other non-personal information available to devices displaying graphical elements, or publicly available information.

What is claimed is:

1. A non-transitory computer-readable storage medium storing one or more programs, the one or more programs comprising instructions, which when executed by one or more processors of an electronic device, cause the electronic device to:
   display a content feed comprising a plurality of displayed cards, wherein each card of the plurality of displayed cards has a respective determined relevance score;
   detect a new type of available information, the new type of available information being associated with a first card for display in the content feed;
   determine that the first card has not been previously displayed in the content feed;
   in accordance with detecting the new type of available information:
      determine a relevance score of the first card;
      determine a display threshold based on the respective determined relevance scores of the plurality of displayed cards; and
      after determining the relevance score of the first card and the display threshold, increase, based on the determination that the first card has not been previously displayed in the content feed, the relevance score of the first card from below the display threshold to above the display threshold, wherein each card for display in the content feed having a respective relevance score above the display threshold is displayed in the content feed, and wherein each card for display in the content feed having the respective relevance score below the display threshold is not displayed in the content feed;
   in accordance with increasing the relevance score of the first card above the display threshold:
      cause the first card to be displayed in the content feed;
      obtain data representing user interaction with the displayed first card;
      adjust, based on the data representing user interaction with the displayed first card, the relevance score of the first card; and
      modify the display of the first card in the content feed based on the adjusted relevance score of the first card.

2. The non-transitory computer-readable storage medium of claim 1, wherein detecting the new type of available information includes:
   determining that a display frequency of the first card in the content feed is below a threshold display frequency.

3. The non-transitory computer-readable storage medium of claim 1, wherein:
   the first card is included in a plurality of cards for display in the content feed, the plurality of cards each having a second respective relevance score; and
   wherein increasing the relevance score of the first card above the display threshold includes increasing the relevance score of the first card above every other relevance score of the second respective relevance scores.

4. The non-transitory computer-readable storage medium of claim 1, wherein causing the first card to be displayed in the content feed includes causing the first card to be displayed at the top of the content feed.

5. The non-transitory computer-readable storage medium of claim 1, wherein causing the first card to be displayed in the content feed includes causing the first card to be displayed at a position in the content feed based on the relevance score of the first card.

6. The non-transitory computer-readable storage medium of claim 1, wherein:
   obtaining the data representing user interaction with the displayed first card includes obtaining a signal representing user interest in the displayed first card; and
   adjusting the relevance score of the first card includes increasing the relevance score of the first card in accordance with obtaining the signal representing user interest in the displayed first card.

7. The non-transitory computer-readable storage medium of claim 6, wherein the signal representing user interest in the displayed first card indicates a user-performed gesture associated with the displayed first card.

8. The non-transitory computer-readable storage medium of claim 6, wherein modifying the display of the first card in the content feed includes:
   in accordance with increasing the relevance score of the first card, increasing a first display rank of the first card in the content feed.

9. The non-transitory computer-readable storage medium of claim 1, wherein:
   obtaining the data representing user interaction with the displayed first card includes obtaining a signal representing user disinterest in the displayed first card; and
   adjusting the relevance score of the first card includes decreasing the relevance score of the first card in accordance with obtaining the signal representing user disinterest in the displayed first card.

10. The non-transitory computer-readable storage medium of claim 9, wherein the signal representing user disinterest in the displayed first card indicates that a user scrolled past the first card in the content feed within a predetermined duration of displaying the first card in the content feed.

11. The non-transitory computer-readable storage medium of claim 9, wherein modifying the display of the first card in the content feed includes:
   in accordance with decreasing the relevance score of the first card, decreasing a second display rank of the first card in the content feed.

12. The non-transitory computer-readable storage medium of claim 1, wherein:
   adjusting the relevance score of the first card includes decreasing the relevance score of the first card below a second display threshold; and
   modifying the display of the first card in the content feed includes ceasing to display the first card in the content feed in accordance with decreasing the relevance score of the first card below the second display threshold.

13. The non-transitory computer-readable storage medium of claim 1, wherein increasing the relevance score of the first card above the display threshold includes increasing the relevance score of the first card by a predetermined amount, and wherein the one or more programs further comprise instructions, which when executed by the one or more processors, cause the electronic device to:

determine that a second display frequency of the first card in the content feed is above a second threshold display frequency; and in accordance with determining that the second display frequency is above the second threshold display frequency:

cease to increase the relevance score of the first card by the predetermined amount.

14. The non-transitory computer-readable storage medium of claim 1, wherein:

determining the relevance score of the first card includes determining the relevance score of the first card using a relevance model, the relevance score of the first card being less than the display threshold; and adjusting the relevance score of the first card includes training the relevance model based on the data representing user interaction with the displayed first card.

15. The non-transitory computer-readable storage medium of claim 1, wherein the one or more programs further comprise instructions, which when executed by the one or more processors, cause the electronic device to:

determine that a third display frequency of a second card previously displayed in the content feed is below a third threshold display frequency, wherein:

the second card is associated with a type of available information different from the new type of available information;

the second card is not displayed in the content feed at a first time; and a relevance score of the second card is below a second display threshold at the first time;

in accordance with determining that the third display frequency is below the third threshold display frequency:

automatically increase, at a second time after the first time, based on the determination that the third display frequency is below the third threshold display frequency, the relevance score of the second card above the second display threshold; and in accordance with increasing the relevance score of the second card above the second display threshold, cause the second card to be displayed in the content feed.

16. The non-transitory computer-readable storage medium of claim 1, wherein:

the new type of available information includes health information; and the content feed is associated with a health related application installed on the electronic device.

17. The non-transitory computer-readable storage medium of claim 1, wherein the new type of available information is provided by an external electronic device configured to detect the new type of available information.

18. An electronic device, comprising:

one or more processors;

a memory; and one or more programs, wherein the one or more programs are stored in the memory and configured to be executed by the one or more processors, the one or more programs including instructions for:

displaying a content feed comprising a plurality of displayed cards, wherein each card of the plurality of displayed cards has a respective determined relevance score;

detecting a new type of available information, the new type of available information being associated with a first card for display in the content feed;

determining that the first card has not been previously displayed in the content feed;

in accordance with detecting the new type of available information:

determining a relevance score of the first card;

determining a display threshold based on the respective determined relevance scores of the plurality of displayed cards; and after determining the relevance score of the first card and the display threshold, increasing, based on the determination that the first card has not been previously displayed in the content feed, the relevance score of the first card from below the display threshold to above the display threshold, wherein each card for display in the content feed having a respective relevance score above the display threshold is displayed in the content feed, and wherein each card for display in the content feed having the respective relevance score below the display threshold is not displayed in the content feed;

in accordance with increasing the relevance score of the first card above the display threshold:

causing the first card to be displayed in the content feed;

obtaining data representing user interaction with the displayed first card;

adjusting, based on the data representing user interaction with the displayed first card, the relevance score of the first card; and modifying the display of the first card in the content feed based on the adjusted relevance score of the first card.

19. A method, comprising:

at an electronic device with one or more processors and memory:

displaying a content feed comprising a plurality of displayed cards, wherein each card of the plurality of displayed cards has a respective determined relevance score;

detecting a new type of available information, the new type of available information being associated with a first card for display in the content feed;

determining that the first card has not been previously displayed in the content feed;

in accordance with detecting the new type of available information:

determining a relevance score of the first card;

determining a display threshold based on the respective determined relevance scores of the plurality of displayed cards; and after determining the relevance score of the first card and the display threshold, increasing, based on the determination that the first card has not been previously displayed in the content feed, the relevance score of the first card from below the display threshold to above the display threshold, wherein each card for display in the content feed having a respective relevance score above the display threshold is displayed in the content feed, and wherein each card for display in the content feed having the respective relevance score below the display threshold is not displayed in the content feed;

in accordance with increasing the relevance score of the first card above the display threshold:
  causing the first card to be displayed in the content feed;
  obtaining data representing user interaction with the displayed first card;
  adjusting, based on the data representing user interaction with the displayed first card, the relevance score of the first card; and
  modifying the display of the first card in the content feed based on the adjusted relevance score of the first card.

20. The electronic device of claim 18, wherein detecting the new type of available information includes:
  determining that a display frequency of the first card in the content feed is below a threshold display frequency.

21. The electronic device of claim 18, wherein:
  the first card is included in a plurality of cards for display in the content feed, the plurality of cards each having a second respective relevance score; and
  wherein increasing the relevance score of the first card above the display threshold includes increasing the relevance score of the first card above every other relevance score of the second respective relevance scores.

22. The electronic device of claim 18, wherein causing the first card to be displayed in the content feed includes causing the first card to be displayed at the top of the content feed.

23. The electronic device of claim 18, wherein causing the first card to be displayed in the content feed includes causing the first card to be displayed at a position in the content feed based on the relevance score of the first card.

24. The electronic device of claim 18, wherein:
  obtaining the data representing user interaction with the displayed first card includes obtaining a signal representing user interest in the displayed first card; and
  adjusting the relevance score of the first card includes increasing the relevance score of the first card in accordance with obtaining the signal representing user interest in the displayed first card.

25. The electronic device of claim 24, wherein the signal representing user interest in the displayed first card indicates a user-performed gesture associated with the displayed first card.

26. The electronic device of claim 24, wherein modifying the display of the first card in the content feed includes:
  in accordance with increasing the relevance score of the first card, increasing a first display rank of the first card in the content feed.

27. The electronic device of claim 18, wherein:
  obtaining the data representing user interaction with the displayed first card includes obtaining a signal representing user disinterest in the displayed first card; and
  adjusting the relevance score of the first card includes decreasing the relevance score of the first card in accordance with obtaining the signal representing user disinterest in the displayed first card.

28. The electronic device of claim 27, wherein the signal representing user disinterest in the displayed first card indicates that a user scrolled past the first card in the content feed within a predetermined duration of displaying the first card in the content feed.

29. The electronic device of claim 27, wherein modifying the display of the first card in the content feed includes:
  in accordance with decreasing the relevance score of the first card, decreasing a second display rank of the first card in the content feed.

30. The electronic device of claim 18, wherein:
  adjusting the relevance score of the first card includes decreasing the relevance score of the first card below a second display threshold; and
  modifying the display of the first card in the content feed includes ceasing to display the first card in the content feed in accordance with decreasing the relevance score of the first card below the second display threshold.

31. The electronic device of claim 18, wherein increasing the relevance score of the first card above the display threshold includes increasing the relevance score of the first card by a predetermined amount, and wherein the one or more programs further include instructions for:
  determining that a second display frequency of the first card in the content feed is above a second threshold display frequency; and
  in accordance with determining that the second display frequency is above the second threshold display frequency:
    ceasing to increase the relevance score of the first card by the predetermined amount.

32. The electronic device of claim 18, wherein:
  determining the relevance score of the first card includes determining the relevance score of the first card using a relevance model, the relevance score of the first card being less than the display threshold; and
  adjusting the relevance score of the first card includes training the relevance model based on the data representing user interaction with the displayed first card.

33. The electronic device of claim 18, wherein the one or more programs further include instructions for:
  determining that a third display frequency of a second card previously displayed in the content feed is below a third threshold display frequency, wherein:
    the second card is associated with a type of available information different from the new type of available information;
    the second card is not displayed in the content feed at a first time; and
    a relevance score of the second card is below a second display threshold at the first time;
  in accordance with determining that the third display frequency is below the third threshold display frequency:
    automatically increasing, at a second time after the first time, based on the determination that the third display frequency is below the third threshold display frequency, the relevance score of the second card above the second display threshold; and
    in accordance with increasing the relevance score of the second card above the second display threshold, causing the second card to be displayed in the content feed.

34. The electronic device of claim 18, wherein:
  the new type of available information includes health information; and
  the content feed is associated with a health related application installed on the electronic device.

35. The electronic device of claim 18, wherein the new type of available information is provided by an external electronic device configured to detect the new type of available information.

36. The method of claim 19, wherein detecting the new type of available information includes:
  determining that a display frequency of the first card in the content feed is below a threshold display frequency.

37. The method of claim 19, wherein:
the first card is included in a plurality of cards for display in the content feed, the plurality of cards each having a second respective relevance score; and
wherein increasing the relevance score of the first card above the display threshold includes increasing the relevance score of the first card above every other relevance score of the second respective relevance scores.

38. The method of claim 19, wherein causing the first card to be displayed in the content feed includes causing the first card to be displayed at the top of the content feed.

39. The method of claim 19, wherein causing the first card to be displayed in the content feed includes causing the first card to be displayed at a position in the content feed based on the relevance score of the first card.

40. The method of claim 19, wherein:
obtaining the data representing user interaction with the displayed first card includes obtaining a signal representing user interest in the displayed first card; and
adjusting the relevance score of the first card includes increasing the relevance score of the first card in accordance with obtaining the signal representing user interest in the displayed first card.

41. The method of claim 40, wherein the signal representing user interest in the displayed first card indicates a user-performed gesture associated with the displayed first card.

42. The method of claim 40, wherein modifying the display of the first card in the content feed includes:
in accordance with increasing the relevance score of the first card, increasing a first display rank of the first card in the content feed.

43. The method of claim 19, wherein:
obtaining the data representing user interaction with the displayed first card includes obtaining a signal representing user disinterest in the displayed first card; and
adjusting the relevance score of the first card includes decreasing the relevance score of the first card in accordance with obtaining the signal representing user disinterest in the displayed first card.

44. The method of claim 43, wherein the signal representing user disinterest in the displayed first card indicates that a user scrolled past the first card in the content feed within a predetermined duration of displaying the first card in the content feed.

45. The method of claim 43, wherein modifying the display of the first card in the content feed includes:
in accordance with decreasing the relevance score of the first card, decreasing a second display rank of the first card in the content feed.

46. The method of claim 19, wherein:
adjusting the relevance score of the first card includes decreasing the relevance score of the first card below a second display threshold; and
modifying the display of the first card in the content feed includes ceasing to display the first card in the content feed in accordance with decreasing the relevance score of the first card below the second display threshold.

47. The method of claim 19, wherein increasing the relevance score of the first card above the display threshold includes increasing the relevance score of the first card by a predetermined amount, and wherein the method further comprises:
determining that a second display frequency of the first card in the content feed is above a second threshold display frequency; and
in accordance with determining that the second display frequency is above the second threshold display frequency:
ceasing to increase the relevance score of the first card by the predetermined amount.

48. The method of claim 19, wherein:
determining the relevance score of the first card includes determining the relevance score of the first card using a relevance model, the relevance score of the first card being less than the display threshold; and
adjusting the relevance score of the first card includes training the relevance model based on the data representing user interaction with the displayed first card.

49. The method of claim 19, further comprising:
determining that a third display frequency of a second card previously displayed in the content feed is below a third threshold display frequency, wherein:
the second card is associated with a type of available information different from the new type of available information;
the second card is not displayed in the content feed at a first time; and
a relevance score of the second card is below a second display threshold at the first time;
in accordance with determining that the third display frequency is below the third threshold display frequency:
automatically increasing, at a second time after the first time, based on the determination that the third display frequency is below the third threshold display frequency, the relevance score of the second card above the second display threshold; and
in accordance with increasing the relevance score of the second card above the second display threshold, causing the second card to be displayed in the content feed.

50. The method of claim 19, wherein:
the new type of available information includes health information; and
the content feed is associated with a health related application installed on the electronic device.

51. The method of claim 19, wherein the new type of available information is provided by an external electronic device configured to detect the new type of available information.

* * * * *